US011039250B2

United States Patent
Draper et al.

(10) Patent No.: US 11,039,250 B2
(45) Date of Patent: Jun. 15, 2021

(54) SYSTEM, METHOD, AND COMPUTER READABLE STORAGE MEDIUM FOR CONTROLLING AN IN CAR COMMUNICATION SYSTEM

(71) Applicant: Peiker acustic GmbH, Friedrichsdorf (DE)

(72) Inventors: Andrew Draper, Grosse Pointe, MI (US); Aaron Kubat, Harrison Township, MI (US)

(73) Assignee: Peiker acustic GmbH, Friedrichsdorf (DE)

( * ) Notice: Subject to any disclaimer, the term of this patent is extended or adjusted under 35 U.S.C. 154(b) by 10 days.

(21) Appl. No.: 16/577,743

(22) Filed: Sep. 20, 2019

(65) Prior Publication Data
US 2021/0092522 A1    Mar. 25, 2021

(51) Int. Cl.
| | |
|---|---|
| H04R 3/12 | (2006.01) |
| H04R 5/04 | (2006.01) |
| G10L 25/51 | (2013.01) |
| G10L 25/84 | (2013.01) |
| B60R 16/037 | (2006.01) |
| H04R 3/00 | (2006.01) |
| B60R 11/02 | (2006.01) |

(52) U.S. Cl.
CPC ........... *H04R 5/04* (2013.01); *B60R 11/0217* (2013.01); *B60R 11/0247* (2013.01); *B60R 11/0264* (2013.01); *H04R 3/005* (2013.01); *H04R 3/12* (2013.01); *H04R 2400/01* (2013.01); *H04R 2499/13* (2013.01)

(58) Field of Classification Search
CPC ............. B60R 16/0373; B60R 11/0264; B60R 11/0217; B60R 11/0247; H04R 5/04; H04R 3/12; H04R 2499/13; G06F 3/165; G06F 3/162; G06F 3/017; G08B 6/00; H04M 1/6016; G10L 25/84; G10L 25/51
USPC ....... 381/26, 58, 86, 59, 56, 71.2, 71.4, 104, 381/102
See application file for complete search history.

(56) References Cited

U.S. PATENT DOCUMENTS

| | | |
|---|---|---|
| 5,226,090 A | 7/1993 | Kimura |
| 9,717,132 B2 | 7/2017 | Sun et al. |
| 2006/0034466 A1* | 2/2006 | Form ................... H04R 5/04 381/86 |
| 2013/0022214 A1 | 1/2013 | Dickins et al. |

(Continued)

*Primary Examiner* — Vivian C Chin
*Assistant Examiner* — Ubachukwu A Odunukwe
(74) *Attorney, Agent, or Firm* — Oblon, McClelland, Maier & Neustadt, L.L.P.

(57) ABSTRACT

A method, system, and computer-readable storage medium that receive a first audio signal generated by a first microphone of a plurality of microphones having a sound inlet, detect an acoustic disturbance in the received first audio signal, the detected acoustic disturbance in the received first audio signal resulting from a tactile interaction proximate the sound inlet of the first microphone, determine whether the detected acoustic disturbance correlates to a pre-defined acoustic signature, and generate, based upon determining that the detected acoustic disturbance correlates to the pre-defined acoustic signature, a control signal corresponding to the pre-defined acoustic signature, the generated control signal controlling one or more of a plurality of speakers of an in-vehicle communication system.

20 Claims, 17 Drawing Sheets

(56) References Cited

U.S. PATENT DOCUMENTS

| | | | |
|---|---|---|---|
| 2014/0074480 A1* | 3/2014 | Gratke | ............... B60R 16/0373 704/275 |
| 2014/0203939 A1 | 7/2014 | Harrington et al. | |
| 2016/0284176 A1 | 9/2016 | Harrington et al. | |
| 2017/0090865 A1* | 3/2017 | Armstrong-Muntner | .................... G10L 25/51 |

* cited by examiner

SYSTEM, METHOD, AND COMPUTER READABLE STORAGE MEDIUM FOR CONTROLLING AN IN CAR COMMUNICATION SYSTEM

BACKGROUND

Field of the Disclosure

The present disclosure relates to operation and control of an in-car communication system of a vehicle.

Description of the Related Art

Communication between passengers of a vehicle, particularly when traveling at moderate or high speeds, can be made difficult by road noise, engine noise, audio noise, and other types of usually elevated ambient sounds. Moreover, the fact passengers rarely face each other during conversation, as is the case when a driver is conversing with a passenger in the rear of the vehicle while focusing on a roadway, further complicates the ability to hear and respond to other passengers.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, system, and computer-readable storage medium comprising processing circuitry configured to perform a method for controlling a plurality of speakers of an in-vehicle communication system.

According to an embodiment, the present disclosure further relates to a method for controlling a plurality of speakers of an in-vehicle communication system, comprising receiving, by processing circuitry, a first audio signal generated by a first microphone of a plurality of microphones having a sound inlet, detecting, by the processing circuitry, an acoustic disturbance in the received first audio signal, the detected acoustic disturbance in the received first audio signal resulting from a tactile interaction proximate the sound inlet of the first microphone, determining, by the processing circuitry, whether the detected acoustic disturbance correlates to a pre-defined acoustic signature, and generating, by the processing circuitry and based upon the determining that the detected acoustic disturbance correlates to the pre-defined acoustic signature, a control signal corresponding to the pre-defined acoustic signature, the generated control signal controlling one or more of the plurality of speakers of the in-vehicle communication system, the method further comprising generating, by the processing circuitry, a second acoustic output based at least on the received first audio signal and a third audio signal corresponding to a third microphone of the plurality of microphones, a second acoustic output being output to a second speaker of the plurality of speakers of the in-vehicle communication system, wherein a first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates the first microphone of the plurality of microphones is active, the method further comprising generating, by the processing circuitry, a second acoustic output based at least on a third audio signal corresponding to a third microphone of the plurality of microphones, the second acoustic output being output to a second speaker of the plurality of speakers, and generating, by the processing circuitry, a first acoustic output excluding a second audio signal corresponding to a second microphone of the plurality of microphones and the third audio signal corresponding to the third microphone of the plurality of microphones, the generated first acoustic output being output to a first speaker of the plurality of speakers, wherein the first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates an exclusion of the first audio signal from the plurality of speakers.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
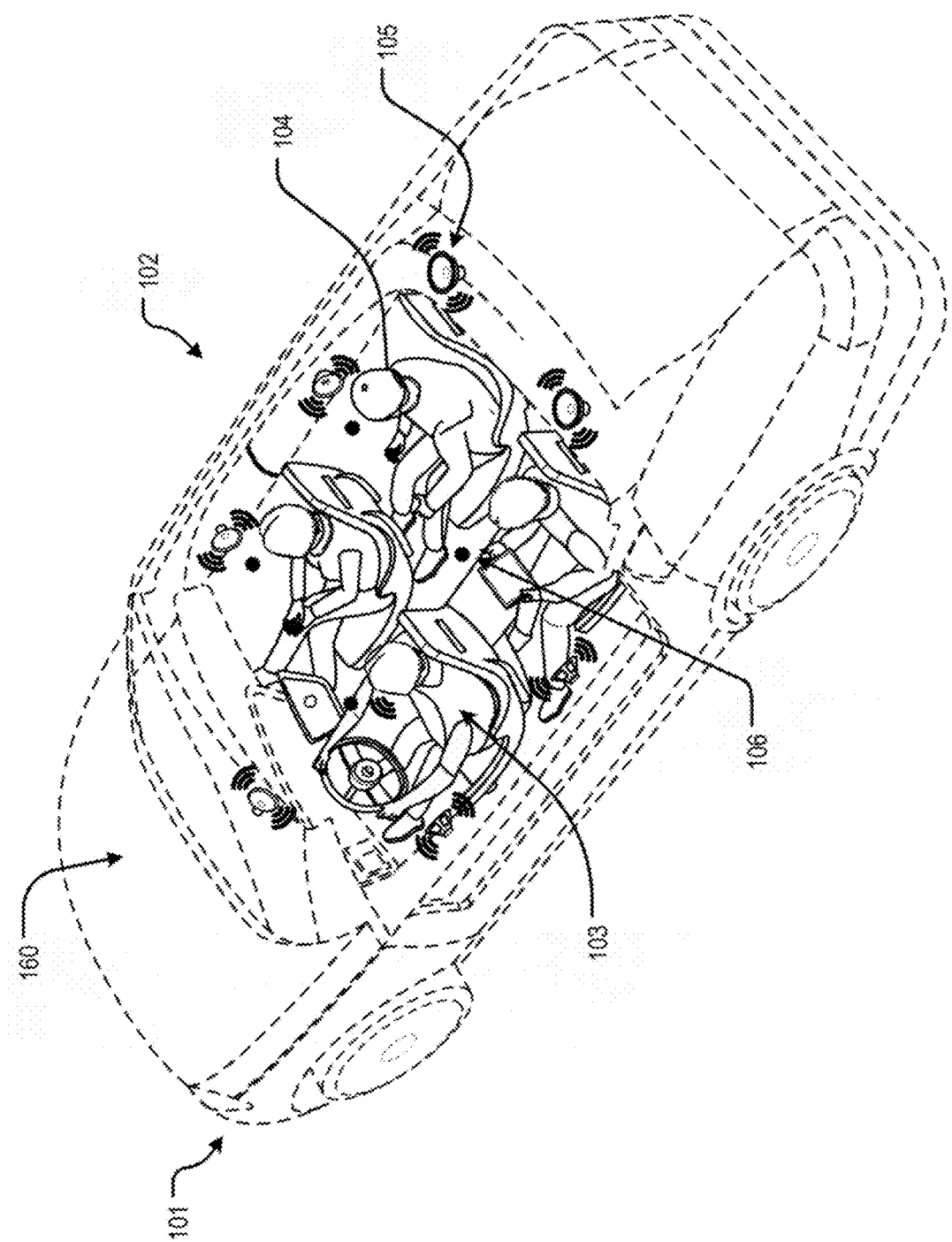
FIG. 1 is an illustration of an in-car communication system of a vehicle.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

An in-car communication system may address the above-described issues related to communication between passengers. Accordingly, such an approach aims to facilitate passenger conversation, enabling, in an example, listening passengers in the rear of the vehicle to easily hear a voice of a driver in the front of the vehicle.

In certain instances, however, a passenger of a vehicle may not desire to be included in vehicle conversation(s). For example, a family may be traveling on a long distance road trip, and a passenger in the rear of the vehicle may wish to sleep. It can be appreciated that it would be preferable if, in such a case, such in-car communication system could be personalized to each passenger of the vehicle, allowing each passenger to control his or her participation in conversation and, thereby, his or her acoustic environment.

Accordingly, the present disclosure provides a method for controlling an in-car communication system such that a passenger can control his or her participation in vehicle conversation by engaging or disengaging, or adjusting a participation status of, an auditory zone of a vehicle.

According to an embodiment, the present disclosure describes an in-car communication (ICC) system whereby passenger speech can be enhanced and directed to other occupants via a specialized signal processing system, the enhancement and direction to other occupants being a seemingly natural effect. For instance, assuming a driver of a vehicle is speaking, enhancement and direction of the voice of the driver, via the ICC system, will be experienced different by a passenger seated in a rear right position of a vehicle and by a passenger seated in a rear left position of the vehicle.

In an embodiment, the ICC system can include a centralized processor (e.g. a digital signal processor) and a plurality of speakers and a plurality of microphones arranged within a cabin of a vehicle, the plurality of speakers and the plurality of microphones positioned such that each passenger can be associated with an auditory zone including at least one microphone and at least one speaker. In an example, the auditory zone may be defined, in part, by a seat position. In another example, the auditory zone may be defined, in part, by a region of the vehicle such as, for instance, front seats and rear seats.

According to an embodiment, the present disclosure describes a method for controlling an ICC system responsive to intent of a passenger. In an embodiment, the present disclosure describes a method for controlling the ICC system, wherein a passenger may elect to include or exclude a respective auditory zone of the vehicle. For instance, a passenger seated in a particular auditory zone may prefer privacy and wish to exclude themselves from vehicle conversation. Accordingly, the passenger may indicate via a user interface, such as a human-machine-interface (HMI), the intent to exclude his or her respective auditory zone from the vehicle conversation.

According to an embodiment, the present disclosure describes a method for controlling an ICC system, wherein each auditory zone can be equipped with a respective auditory device including a microphone, the auditory device being the user interface or human-machine interface introduced above. In an example, the microphone can be configured to measure sound generated by interaction of the passenger with a housing of a respective auditory device, the measured sound being recorded for a respective auditory zone for subsequent processing and analysis.

In an embodiment, the interaction of the passenger with the housing of the auditory device can indicate intent of the passenger. The interaction of the passenger with the housing of the auditory device may result in a detectable acoustic disturbance in the measured and recorded sound. For instance, the interaction can be a tapping motion or flicking motion which can be detected above ambient noise, a finger of a hand of the passenger being used to indicate intent of the passenger. In an example, the detected acoustic disturbance can contain an identifiable acoustic signature, the identifiable acoustic signature being correlated with intent of the passenger.

In an embodiment, and as introduced above, the measured and recorded sound can be correlated with intent of the passenger. For instance, the sound may be a series of tapping motions that can be correlated, as a non-limiting example, with intent of the passenger to change a participation status of a respective auditory zone (e.g. indicate whether they desire to be included or excluded from vehicle conversation).

In an embodiment, a participation status of an auditory zone, as an example of a correlated intent of the passenger, in an example, can be confirmed to the requesting passenger, and communicated to other passengers of the vehicle, by a visual indicator. The visual indicator may be a light-emitting diode disposed within or on a housing of the auditory device. The light-emitting diode can indicate, in an example and when illuminated, that an auditory zone and a passenger therein are currently participating in vehicle conversation. It can be appreciated that the visual indicator can serve any purpose indicative of an intent of a passenger of an auditory zone.

According to an embodiment, and based on a participation status of an auditory zone, an acoustic output can be modified. For instance, if an auditory zone is inactive, an acoustic output provided to speakers of the auditory zone can be void of modified speech sensed at auditory devices of other auditory zones, the acoustic output being only sound from a radio, compact disc player, or other vehicle audio input.

According to an embodiment, the present disclosure describes a method for controlling an ICC system, the method being performed and/or implemented via a centralized processor such as a centralized digital signal processor. Such method will now be described with reference to the Figures.

According to an embodiment, the present disclosure will be described in view of exemplary embodiments. FIG. 1 is an illustration of an ICC system 102 of a vehicle 101. The vehicle 101 may include an electronics control unit (ECU) 160 configured to perform a method of the ICC system 102, the ECU 160 being in communication with and control of a plurality of microphones 106 of the vehicle 101 and a plurality of speakers 105 of the vehicle 101. Each of the plurality of microphones 106 of the vehicle 101 can be mounted throughout a cabin of the vehicle 101, including within a headliner of the vehicle 101, as shown in an exemplary embodiment of FIG. 1. In an embodiment, a portion of the plurality of microphones 106 of the vehicle 101 may be associated with a portion of the plurality of speakers 105 of the vehicle 101. As shown in FIG. 1, a plurality of passengers 104 can be in the vehicle 101, including a driver 103.

Under standard operation of the ICC system 102 of the vehicle 101, speech from each of the plurality of passengers 104 of the vehicle 101 can be enhanced and transmitted to each of the other passengers of the plurality of passengers 104 of the vehicle 101 to ensure that communication is not impeded and that all passengers have the opportunity to participate in vehicle conversation. In practice, speech from the driver 103 of the vehicle 101 may be received by one of the plurality of microphones 106 proximate the driver 103 and amplified to the remaining, or listening, passengers of the vehicle 101 via respective speakers of the plurality of speakers 105 proximate thereto. The amplification may not be a uniform amplification to each of the plurality of passengers 104, but instead varied according to location such that echolocation of the speaker is not impacted and normal conversation can proceed. It can be appreciated that speech enhancement or modification, as described above, can be readily performed for each passenger of the vehicle, as appropriate.

Figure 2:
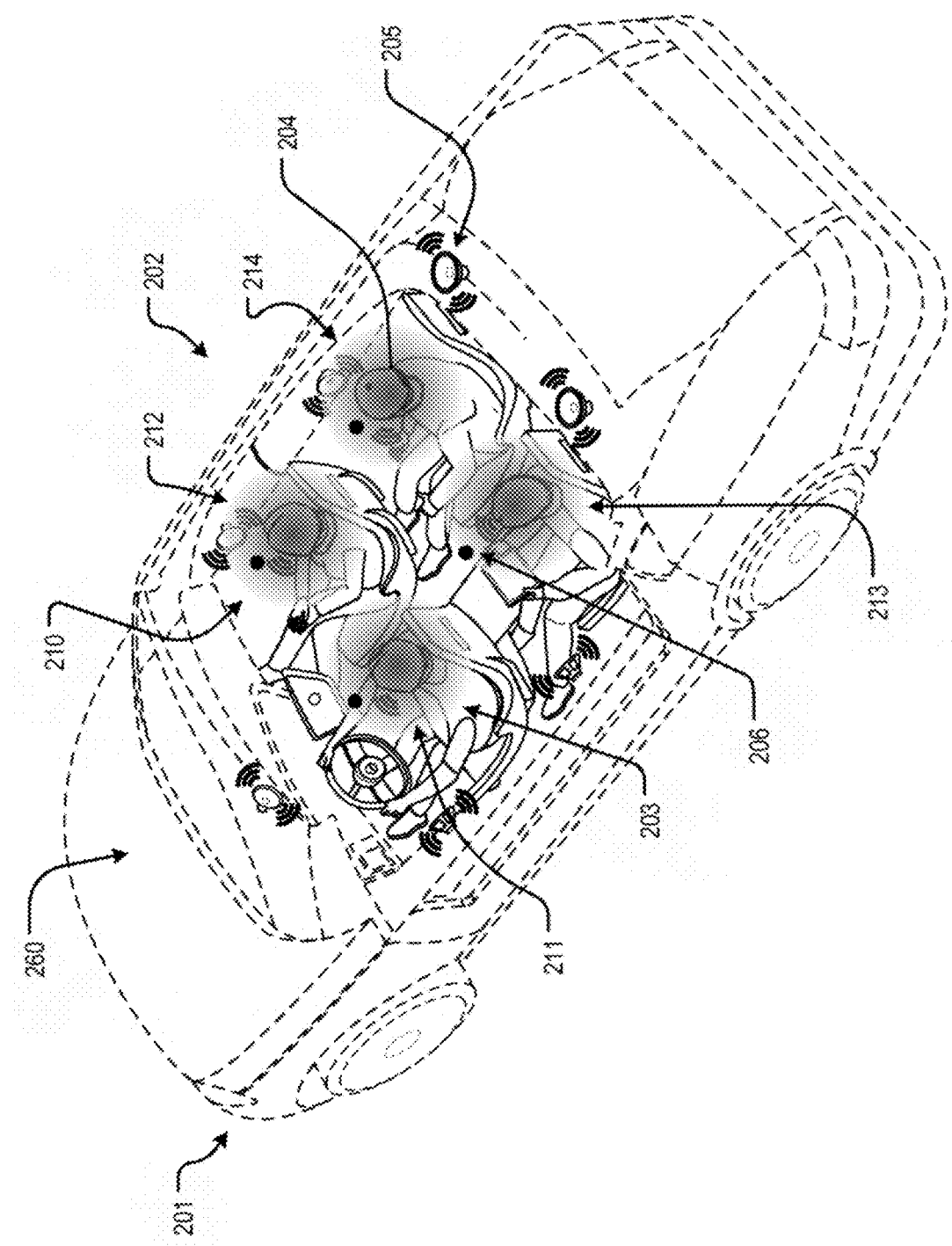
FIG. 2 is an illustration of an in-car communication system of a vehicle, according to an exemplary embodiment of the present disclosure.

The effective result of the ICC system 102 of FIG. 1, providing enhanced communication by relating portions of the plurality of speakers 105 with portions of the plurality of microphones 106, is the creation of auditory zones, as can be seen in FIG. 2. According to an exemplary embodiment of the present disclosure, each of the plurality of passengers 204 of the vehicle 201 including the driver 203, each seat position of the vehicle 201, or each region of the vehicle 201 can be associated with a respective auditory zone 210 of the vehicle 201. Exemplary auditory zones 210 are indicated crudely by a circular hue gradient in FIG. 2. During operation, each of the auditory zones 210 can be monitored by the ECU 260 via an associated portion of the plurality of microphones 206 to determine when and how audio outputs of each of the plurality of speakers 205 associated with other auditory zones 220 should be modified in order to provide the auditory benefit of the ICC system 202.

In an embodiment, each of the auditory zones 210 of the vehicle 201 can be defined by a seat position of the vehicle 201. For instance, auditory zone one 211 can define a seat position of the driver 203, followed by auditory zone two 212, auditory zone three 213, and auditory zone four 214. Attendant microphones 206 and speakers 205 can be positioned proximate a respective auditory zone 210 such that speech spoken therefrom and audio projected thereto can be controlled by the ECU 260 of the vehicle 201 in accordance with the ICC system 202. As described in an exemplary embodiment with reference to FIG. 1, the plurality of microphones 206 may be mounted within a headliner of the vehicle 201. Accordingly, it can be appreciated that the plurality of microphones 206 of FIG. 2 can be relatively positioned above and forward each of the plurality of passengers 204 and relative to, or within, a respective auditory zone 210.

The auditory zones 210 as defined above, however, are merely exemplary of a variety of definitions of auditory zones 210 of a vehicle 201. The number of auditory zones 210 of the vehicle 201 need not be limited by a number of individual seat positions of the vehicle 201 or by any other constraint. For instance, the auditory zones 210 of the vehicle 201 may be defined by regions of the vehicle 201. In an example, seats of the front of the vehicle may define a first auditory zone and seats of the rear of the vehicle may define a second auditory zone. In an example, and as described herein in an embodiment, each of the first auditory zone and the second auditory zone may function as distinct 'acoustic regions' within a single ICC system. In another example, each of the first auditory zone and the second auditory zone may function as distinct 'acoustic regions' and be effectively controlled by separate ICC systems.

Such auditory zones 210, however, may only provide the ability for an ICC system 202 to enhance an audio experience of passengers 204 of a vehicle 201 by, for instance, increasing audio outputs of speakers 205 proximate a first auditory zone 211 responsive to received audio inputs at microphones 206 of a second auditory zone 212, a third auditory zone 213, and a fourth auditory zone 214. This approach, however, makes it impossible for a passenger 204 of the vehicle 201 to remove themselves from vehicle conversation, each auditory zone 210 of the vehicle 201 effectively "participating" in the vehicle conversation under the sole control of the ICC system 202.

Accordingly, the present disclosure describes a method for controlling an ICC system 202 of a vehicle 201 such that a participation status of an auditory zone 210 can be modified, in real-time, by a respective passenger 204 of the auditory zone 210. To this end, FIG. 3A and FIG. 3B provide a mechanism by which a passenger of a vehicle can indicate his or her desire to be included in or excluded from vehicle conversation.

Figure 3B:
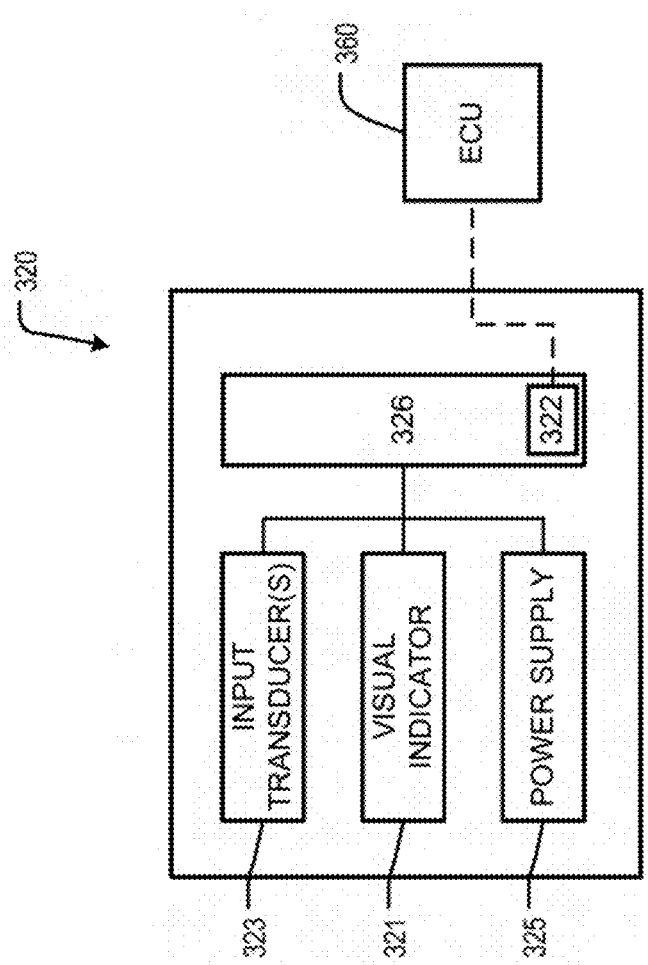
FIG. 3B is a schematic of an auditory device of an in-car communication system, according to an exemplary embodiment of the present disclosure.
Figure 3A:
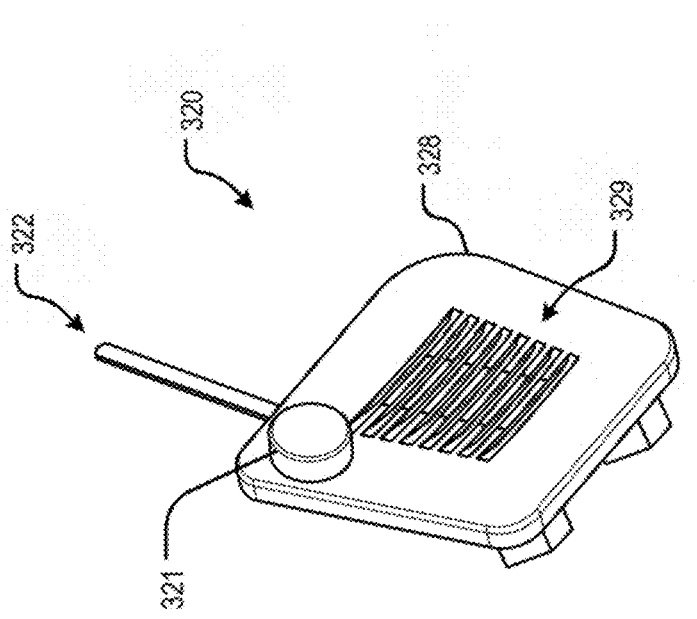
FIG. 3A is an illustration of an auditory device of an in-car communication system, according to an exemplary embodiment of the present disclosure.

First, FIG. 3A is an illustration of an exemplary embodiment of an auditory device 320 of the present disclosure. In an embodiment, the auditory device 320 may be positioned within a headrest, a seatback, a headliner, and the like, or may otherwise be embedded in a vehicle such that the auditory device 320 remains functionally within a respective auditory zone while remaining aesthetically innocuous. Structurally, the auditory device 320 may include housing 328 and at least one input transducer such as a vibration sensor, a light sensor, or, as in the present disclosure, an acoustic sensor such as a microphone. The microphone (not shown) may be mounted on or within the housing 328 such that tactile interaction with the housing 328, by a passenger, may be sensed. Further, the housing 328 may include one or more apertures 329 or, in an example, one or more gratings, such that sound from a tactile interaction may be transmitted through the housing 328 and audio clarity may be preserved. In order to visually alert passengers of a participation status of an auditory zone, a visual indicator 321 may be disposed within or mounted on the housing 328 of the auditory device 320. The visual indicator 321 may, for instance, be a lighting device, a mechanical device, or other means of visual marker. In an example, the visual indicator 321 may be a light-emitting diode (LED) and illumination of the LED may indicate participation of an auditory zone in vehicle conversation.

In an embodiment, audio signals sensed by the at least one input transducer, or microphone, in an example, of the auditory device 320 may be transmitted via a communication hub 322 to an ECU of the vehicle to be processed. The communication hub 322 may provide wired or wireless communication with the ECU of the vehicle. In an example, the ECU of the vehicle may receive audio signals sensed at each of a plurality of auditory devices 320 of the vehicle via wireless communication. The sensed audio signals may be processed, by processing circuitry, in order to implement the functionality of the ICC system. Alternatively, at least preliminary processing of sensed audio signals may be performed by respective processors located within each auditory device 320 of each auditory zone, the preliminarily processed sensed audio signals subsequently being transmitted to the ECU of the vehicle for implementation within the ICC system. In another embodiment, the ECU may be replaced by a cloud-based processing circuitry or may otherwise be supplemented by a cloud-based processing circuitry in order to process the audio signals sensed at each of the plurality of auditory devices 320 of the vehicle and to implement the ICC system.

FIG. 3B is a schematic of hardware of an auditory device 320 of a vehicle, according to an exemplary embodiment of the present disclosure. The auditory device 320 may include each of an at least one input transducer 323, a visual indicator 321, and a power supply 325, the at least one input transducer 323, visual indicator 321, and power supply 325 being in electrical communication with the ECU 360 of the vehicle via a BUS 326 of the auditory device 320. The BUS 326 may include a connection to a communication hub 322 for wired or wireless communication with the ECU 360 of the vehicle. In an embodiment, certain capabilities of processing circuitry of the ECU 360 may be performed by processing circuitry of the auditory device 320, as introduced above, the processing circuitry being in communication, via the BUS 326, with the power supply 325, the visual indicator 321, and the at least one input transducer 323.

Figure 4:
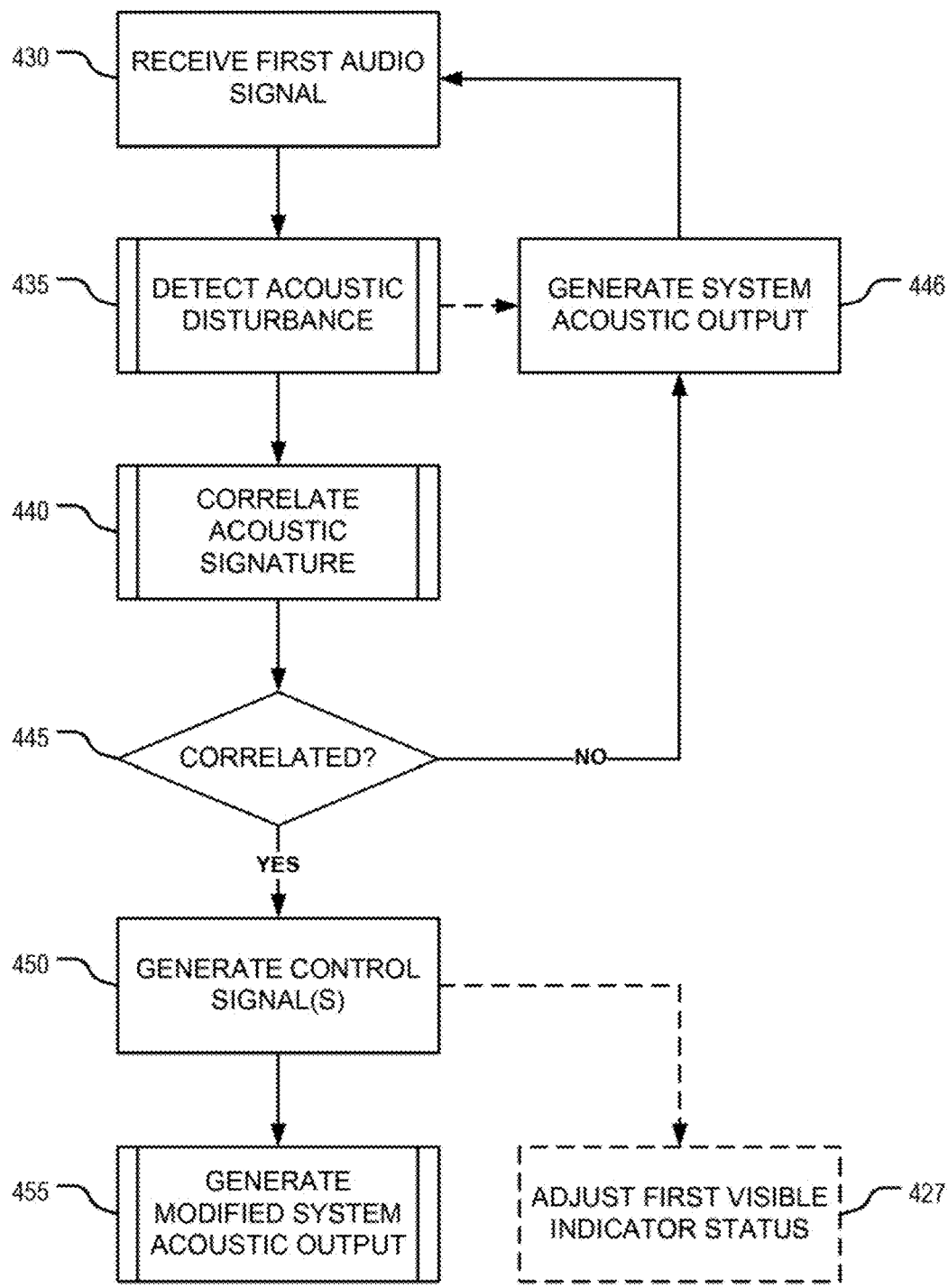
FIG. 4 is a flow diagram of a process of controlling an in-car communication system of a vehicle, according to an exemplary embodiment of the present disclosure.

The auditory device described in FIG. 3A and FIG. 3B will now be implemented within a process of the present disclosure, with reference to FIG. 4. Briefly, process 415 may be performed by the ECU of the vehicle, wherein process 415 includes, for each of a plurality of auditory devices of an ICC system, detection of an acoustic disturbance, correlation of an acoustic signature of the detected acoustic disturbance to a known acoustic signature, and selection of a correlated acoustic signature such that, responsive thereto, process 415 may further include generation, by processing circuitry of the ECU, of at least one control signal for the ICC system. In an embodiment, the control signal can instruct generation of a modified acoustic output for each of the plurality of speakers of the vehicle and provide, in an example, a control signal for a visual indicator of an auditory device.

In particular, process 415 begins at step 430 and will be described from a perspective of a first audio signal being received by an ECU of a vehicle from a first auditory device of auditory zone one.

Accordingly, at step 430 of process 415, the first audio signal may be received from the first auditory device. The first audio signal may be an audio signal reflective of a magnitude and/or a frequency of a sound received over a period of time at the first auditory device.

At sub process 435 of process 415, an acoustic disturbance within the first audio signal can be detected. Detection of an acoustic disturbance will be described in greater detail with reference to FIG. 5A and FIG. 5B, but generally includes comparison of a magnitude and/or frequency of data of the received audio signal to a pre-determined threshold value. The acoustic disturbance may be created by, in an example, tactile interaction of a passenger with the housing of the auditory device. If it is determined, by comparison of the data of the received audio signal to the pre-determined threshold value, that no acoustic disturbance is detected, an acoustic output for a plurality of speakers of the vehicle is generated, as normal, at step 446 of process 415, and process 415 returns to step 430. If, however, an acoustic disturbance is detected in sub process 435, process 415 proceeds to sub process 440 and the detected acoustic disturbance is correlated with a plurality of references, as described below.

Figure 6A:
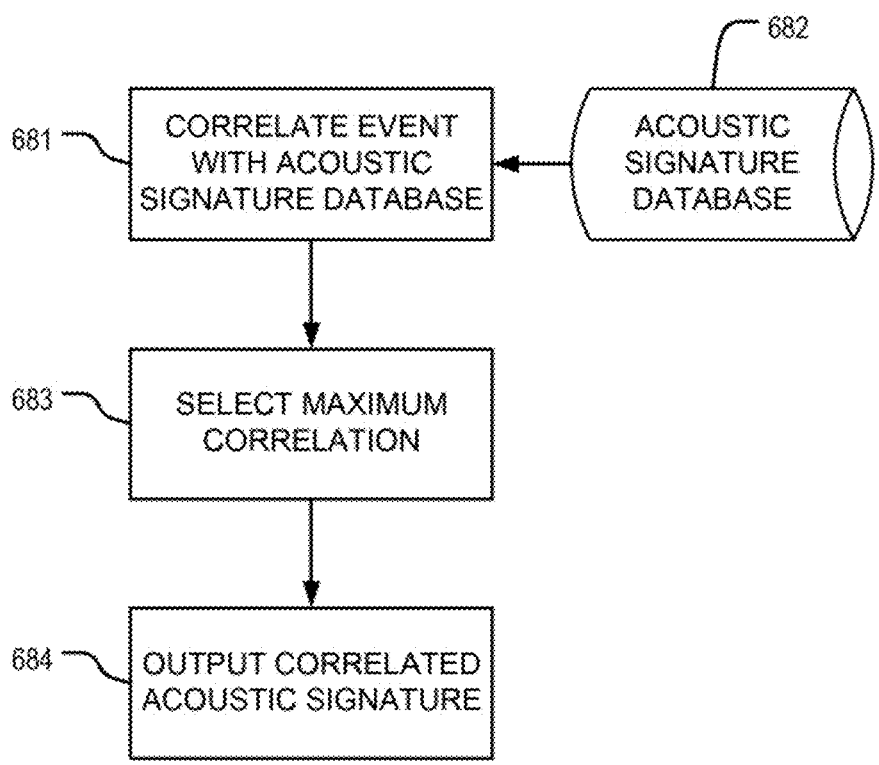
FIG. 6A is a flow diagram of a sub process of a process of controlling an in-car communication system of a vehicle, according to an exemplary embodiment of the present disclosure.

At sub process 440 of process 415, the detected acoustic disturbance can be processed in order to extract an acoustic signature, the unidentified acoustic signature then being correlated with a plurality of reference acoustic signatures. As an audio signal, the unidentified acoustic disturbance can be a swipe, a tap, a flick, or a repetition or combination thereof which is indicative of intent of a passenger as it relates to the ICC system. In an embodiment, an output of sub process 440 can be, in an example, a correlation value or a set of correlation values indicating a level of correlation between the unidentified acoustic signature and a reference acoustic signature of the plurality of reference acoustic signatures. Sub process 440 will be described in greater detail with reference to FIG. 6A and FIG. 6B.

At step 445 of process 415, the reference acoustic signature selected as having a maximal correlation with the unidentified acoustic signature of the detected acoustic disturbance can be compared to a pre-determined correlation threshold value. The pre-determined correlation threshold value may be a minimum correlation value required in order to indicate a similarity between the unidentified acoustic signature and the selected reference acoustic signature. In particular, the correlation value can be evaluated to determine whether the correlation between the unidentified acoustic signature and the reference acoustic signature is significant and, accordingly, if intent of a passenger is properly discerned. If, in an example, the correlation value of the unidentified acoustic signature and the selected reference acoustic signature is determined to be below the pre-determined correlation threshold value, an acoustic output for the plurality of speakers of the vehicle is generated, as normal, at step 446 of process 415 and process 415 subsequently returns to step 430. A result in which a correlation of the unidentified acoustic signature and the selected reference acoustic signature is below the pre-determined correlation threshold value may indicate an error in process 415 or a similar but insignificant acoustic disturbance. If, alternatively, the correlation value of the unidentified acoustic signature and the selected reference acoustic signature is determined to be greater than or equal to the pre-determined correlation threshold value, process 415 proceeds to step 450 and at least one control signal can be generated, accordingly.

The at least one control signal can be generated at step 450 of process 415 in order to inform generation of a modified acoustic output for each of the plurality of speakers of the vehicle. Generation of the modified acoustic output for each of the plurality of speakers of the vehicle will be described with reference to sub process 455 of process 415. The modified acoustic output can include an acoustic output for each auditory zone of the vehicle, each auditory zone being impacted differently based on the location of the auditory zone relative to the origin of the speech being enhanced. For instance, assuming speech originates with auditory zone one, the modified acoustic output of auditory zone two, auditory zone three, and auditory zone four may be different based on their positions relative thereto.

In an embodiment, the generated at least one control signal can reflect a desire of a passenger of auditory zone one to participate in vehicle conversation. In another embodiment, the generated at least one control signal can indicate a desire of the passenger of auditory zone one to modulate the acoustic output of auditory zone one in order to enhance his or her listening experience. For example, the passenger of auditory zone one may wish to adjust a volume of the acoustic output to a comfortable level. Additionally, the passenger may wish to enhance his or her speaking voice within other auditory zones of the vehicle by, for instance, elevating his or her voice within vehicle conversation provided to the other auditory zones of the vehicle. In any event, the generated at least one control signal provides instruction to the ICC system regarding intent of a passenger of a respective auditory zone.

According to an embodiment, generation of the modified acoustic outputs at sub process 455, described in greater detail with reference to FIG. 7A through FIG. 9B, can include removal, or filtering, of the detected acoustic disturbance from the acoustic outputs. In an example, the correlated acoustic signature may be correlated with and indicative of intent of a passenger to be removed from vehicle conversation. Accordingly, and in addition to the filtering of the detected acoustic disturbance from the acoustic outputs, sub process 455 of process 415 can indicate necessary changes to the ICC system such that generated acoustic outputs can be modified to remove a passenger, or auditory zone, from vehicle conversation.

In addition to modification of a generated acoustic output, the at least one control signal can be a signal controlling a status of a visual indicator of an auditory device. Accordingly, at step 427 of process 415, the at least one control signal can be used to adjust the status of the visual indicator of the first auditory device of auditory zone one. For example, and as will be described with respect to FIG. 10 and FIG. 11, the at least one control signal may indicate intent of the passenger of auditory zone one to participate in vehicle conversation and, accordingly, a status of a visual indicator of the first auditory device can be adjusted in order to indicate the same. Presented as a dashed step in FIG. 4, the status of the visual indicator of an auditory device is only adjusted under certain conditions when the correlated acoustic signature mandates it.

Process 415, described above, is a continuous process wherein, after generation of the modified acoustic outputs at sub process 455 of process 415, the process returns to step 430 and an audio signal of the first auditory device is again received for processing within the ICC system. Now, with reference to FIG. 5A through FIG. 11, a more detailed description of process 415 will be described.

Figure 5A:
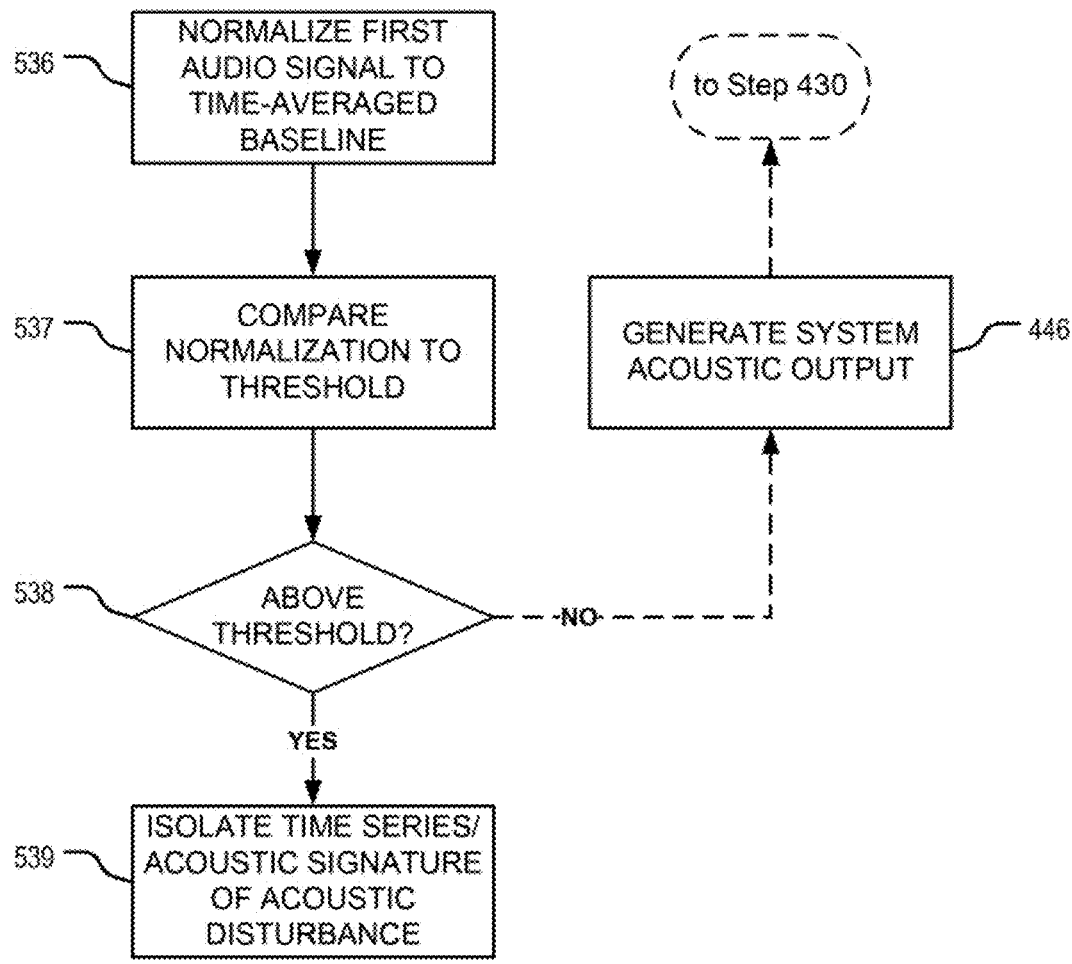
FIG. 5A is a flow diagram of a sub process of a process of controlling an in-car communication system of a vehicle, according to an exemplary embodiment of the present disclosure.
Figure 5B:
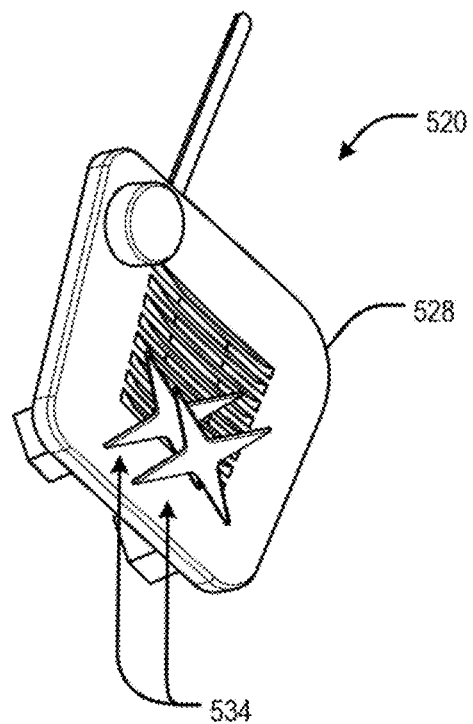
FIG. 5B is an illustration of a sub process of a process of controlling an in-car communication system of a vehicle, according to an exemplary embodiment of the present disclosure.

FIG. 5A and FIG. 5B provide a flow diagram and illustration of sub process 435 of process 415, according to an exemplary embodiment of the present disclosure. At step 536 of sub process 435, the first audio signal received at step 430 of process 415 can be normalized to a baseline in order to account for time-dependent noise and/or drift of the received audio signal. To this end, the baseline can be a time-averaged baseline of the audio signal which can be calculated for a pre-determined period of time. In an example, the pre-determined period of time can be two seconds, though it can be appreciated that any suitable period of time can be considered such that the time-averaged baseline is reflective of a true baseline of the audio signal. The time-dependent average can be updated every two seconds, as indicated above, or at a pre-determined time sequence determined to be appropriate. Having calculated the time-averaged baseline value of the received audio signal, subsequently received audio signal data can be normalized to the calculated time-averaged baseline value. At step 537 of sub process 435, the normalized audio signal can be compared, in real-time, to a pre-determined threshold value. In an embodiment, the pre-determined threshold value is a value above which the received audio signal is determined to be an acoustic disturbance, distinct from normal conversation, road noise, or other aberrant sounds, and reflective of intent of a passenger of an auditory zone. Accordingly, and as introduced in FIG. 4, it may be determined at step 538 of sub process 435 whether the normalized audio signal is greater than or equal to the pre-determined threshold value. If it is determined that the normalized audio signal is not above the pre-determined threshold value, an acoustic output for each of a plurality of speakers of the vehicle can be generated based on a current participation status of each auditory device at step 446 of process 415, and process 415 can return to step 430 wherein an audio signal is again received. Alternatively, if it is determined that the normalized audio signal is greater than or equal to the pre-determined threshold value (i.e. if an acoustic disturbance occurred), sub process 435 proceeds to step 539 wherein a time series of the acoustic disturbance is isolated. The time series of the isolated acoustic disturbance can be referred to as an 'acoustic signature'. In other words, a dataset including the time period during which the acoustic disturbance was detected is recorded as an acoustic signature for further analysis within process 415.

According to an embodiment, and in order to capture intent of a passenger of an auditory zone, the acoustic signature can be defined by, at least, the time period of the dataset including the time point of the initiation of the acoustic disturbance and a pre-determined period of time thereafter. For instance, the acoustic disturbance may be a single interaction of a passenger with the auditory device, a prolonged touching of the auditory device by the passenger, a sequence of interactions by the passenger with the auditory device, or another, similar interaction of the passenger with the auditory device, each 'acoustic signature' therein being reflective of intent of the passenger. In an example, and in view of the above, the pre-determined period of time may be two seconds, three seconds, four seconds, or five seconds, though it can be appreciated, of course, that these pre-determined periods of time are merely exemplary of a variety of periods of time during which intent of a passenger may expected to be communicated. For instance, if interaction of the passenger with the auditory device is limited to changing a participation status of a respective auditory zone, an upper limit of a period of time during which interaction can be reasonably expected may be two seconds. To this end, and with reference again to the Figures, two seconds may be sufficient to recognize two distinct spikes of an acoustic disturbance 534, represented as two star-shaped figures on a housing 528 of an auditory device 520 in FIG. 5B.

Having detected an acoustic disturbance and prepared an isolated time series containing an acoustic signature of the acoustic disturbance at sub process 435, process 415 may proceed to sub process 440. At sub process 440 of process 415, the acoustic signature of the detected acoustic disturbance may be correlated with a reference acoustic signature and thereby identified.

At step 681 of sub process 440, the isolated time series, or acoustic signature, of the detected acoustic disturbance can be correlated with each of a plurality of reference acoustic signatures received from a reference acoustic signature database at step 682. Embodied as one database or as many, separately selectable and curated databases, the reference acoustic signature database may comprise a collection of acoustic signatures associated with defined passenger intent or passenger requests. For instance, the reference acoustic signature database may include a time series reflective of a swipe of a hand of a passenger across housing of an auditory device, the swipe being associated with a request to change a volume of a respective auditory zone of the ICC system. The reference acoustic signature database may also include a time series of a triple tap of a finger on the housing of the auditory device, the triple tap being associated with a request to change a participation status of the respective auditory zone of the ICC system. In other embodiments, a rate at which a tactile interaction with the housing of the auditory device occurs can be evaluated and used to determine passenger intent.

Figure 6B:
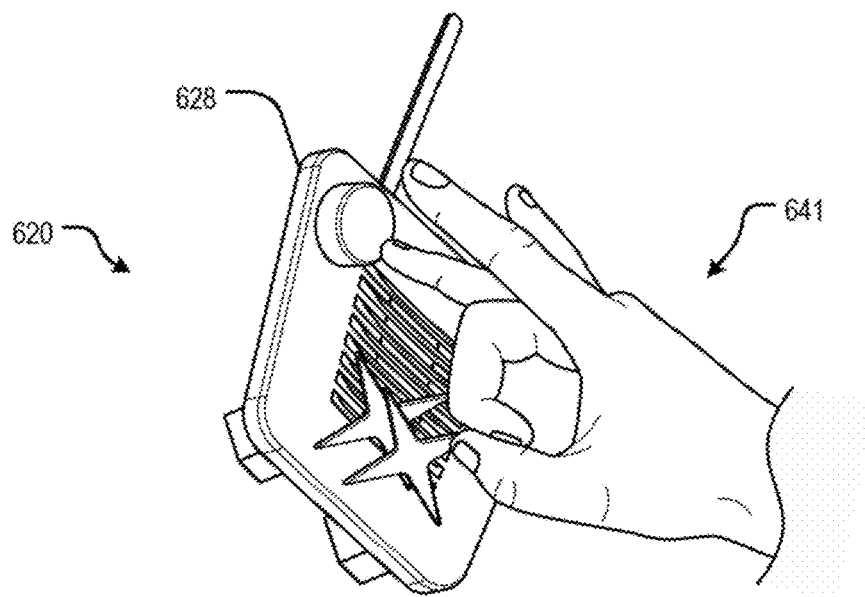
FIG. 6B is an illustration of a sub process of a process of controlling an in-car communication system of a vehicle, according to an exemplary embodiment of the present disclosure.

Having correlated the unidentified acoustic signature of the detected acoustic disturbance with each of the plurality of reference acoustic signatures of the reference acoustic signature database, sub process 440 of process 415 selects a maximal correlation thereof at step 683. The maximal correlation selected at step 683 of sub process 440 reflects the reference acoustic signature most similar to the unidentified acoustic signature of the acoustic disturbance. Accordingly, at step 684 of sub process 440, the selected correlated acoustic signature can then be provided as an output, the selected correlated acoustic signature being associated with a passenger request and the output being provided to the ICC system. With reference to FIG. 6B, the selected correlated acoustic signature may be a double flick 641 of a finger on the housing 628 of the auditory device 620 associated with a participation status change request.

Returning briefly to FIG. 4, following comparison of the selected correlated acoustic signature and a pre-determined correlation threshold value, as described above, the selected correlated acoustic signature can be provided to step 450 of process 415 and an appropriate at least one control signal can be generated thereby. As will be described with reference to FIG. 7A through FIG. 9B, the appropriate at least one control signal generated at step 450 can be provided to sub process 455 of process 415 and the passenger request can be realized.

Figure 7A:
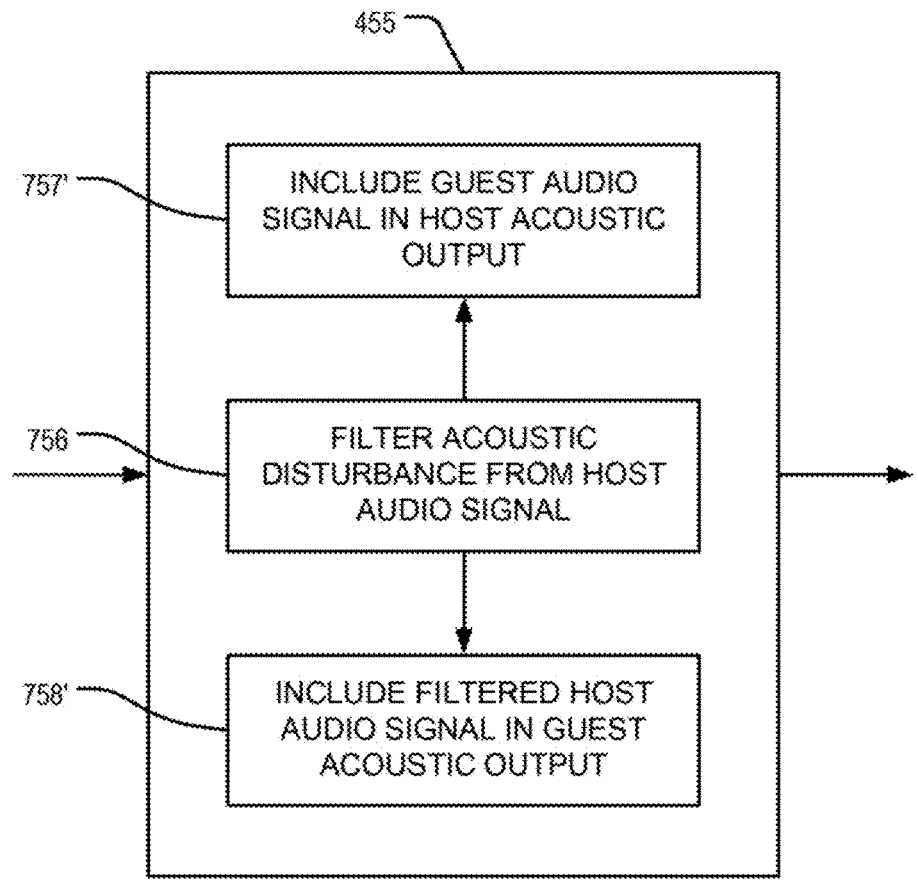
FIG. 7A is a flow diagram of a sub process of a process of controlling an in-car communication system of a vehicle, according to an exemplary embodiment of the present disclosure.

According to an embodiment, sub process 455 of the present disclosure can include the steps described with reference to FIG. 7A. In particular, FIG. 7A reflects a scenario in which a participation status of an auditory zone of a vehicle is changed, responsive to a passenger request, such that the auditory zone is included in vehicle conversation. For breadth, FIG. 7A is presented from the perspective of a received audio signal of a 'host' auditory device and an acoustic output associated with a 'host' auditory zone of the 'host' auditory device. Therefore, for simplicity, auditory devices and respective auditory zones not associated with the aforementioned 'host' auditory zone may be referred to as 'guest' auditory devices and 'guest' auditory zones. It can be appreciated that a similar approach may be applied to one or more of the 'guest' auditory zones of the vehicle.

First, the 'host' audio signal received from step 430 of process 415 can be processed, at step 756 of sub process 455, to remove or filter the detected acoustic disturbance from the received audio signal. In this way, the potentially harsh sound of the detected acoustic disturbance can be prevented from being delivered to each of a plurality of speakers of the 'guest' auditory zones as an acoustic output. Subsequently, at step 757' and step 758', the filtered 'host' audio signal can be integrated with received 'guest' audio signals and can be further modified according to processes of the ICC system. In an embodiment, at step 757', and in order to include the 'host' auditory zone in vehicle conversation, the acoustic output supplied to the 'host' auditory zone, or 'host' acoustic output, can include features of 'guest' audio signals received at each of the 'guest' auditory zones of the vehicle. In an embodiment, at step 758', the acoustic output supplied to each of the 'guest' auditory zones of the vehicle can, necessarily, include features of the 'host' audio signal received at the 'host' auditory zone. In this way, the passenger of the 'host' auditory zone can be included in vehicle conversation.

Figure 7B:
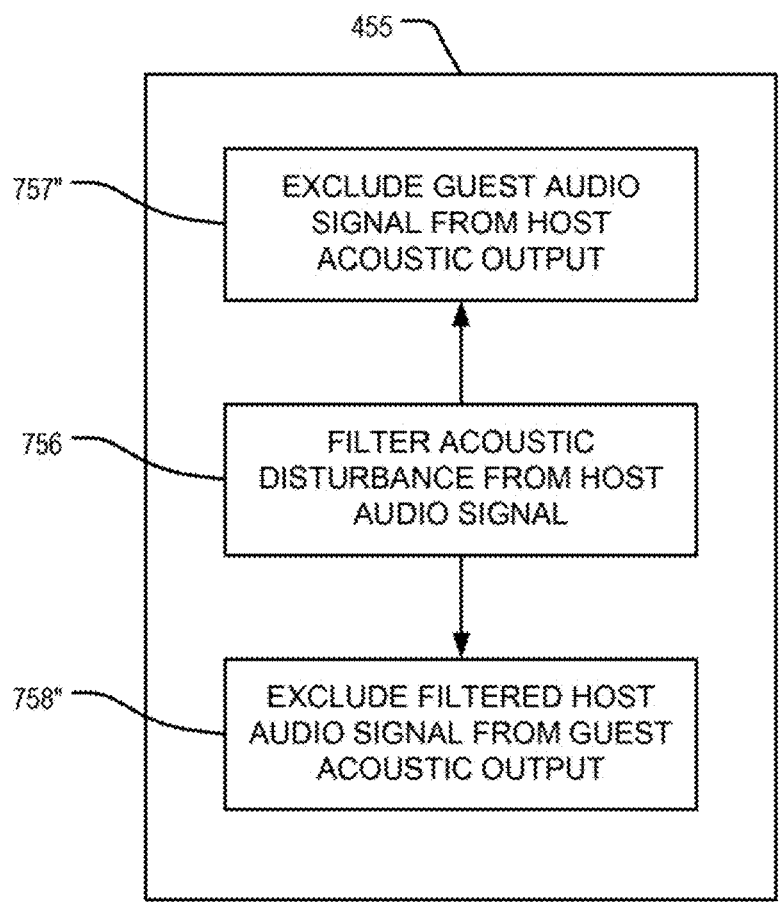
FIG. 7B is a flow diagram of a sub process of a process of controlling an in-car communication system of a vehicle, according to an exemplary embodiment of the present disclosure.

According to another embodiment, sub process 455 of the present disclosure can include the steps described with reference to FIG. 7B. In particular, FIG. 7B reflects a scenario in which a participation status of an auditory zone of a vehicle is changed, responsive to a passenger request, such that the auditory zone is excluded in vehicle conversation. For brevity, FIG. 7B is presented from, similar to that of FIG. 7A, the perspective of a 'host' auditory device and a 'host' auditory zone of the 'host' auditory device.

First, the 'host' audio signal received from step 430 of process 415 can be processed, at step 756 of sub process 455, to remove or filter the detected acoustic disturbance from the received audio signal. In this way, the potentially harsh sound of the detected acoustic disturbance can be prevented from being delivered to each of a plurality of speakers of the 'guest' auditory zones as an acoustic output. Subsequently, at step 757" and step 758", the filtered 'host' audio signal can be integrated with received 'guest' audio signals and can be further modified according to processes of the ICC system. In an embodiment, at step 757', and in order to exclude the 'host' auditory zone from vehicle conversation, the acoustic output supplied to the 'host' auditory zone, or 'host' acoustic output, can exclude features of 'guest' audio signals received at each of the 'guest' auditory zones of the vehicle. In an embodiment, at step 758', the acoustic output supplied to each of the 'guest' auditory zones of the vehicle can, necessarily, exclude features of the 'host' audio signal received at the 'host' auditory zone. In this way, the passenger of the 'host' auditory zone can be excluded from vehicle conversation.

The generalized examples described with reference to the 'host' and 'guest' of FIG. 7A and FIG. 7B will now be described with reference to FIG. 8A through FIG. 9B, wherein the vehicle is a vehicle having auditory zone one, auditory zone two, auditory zone three, and auditory zone four.

Figure 8A:
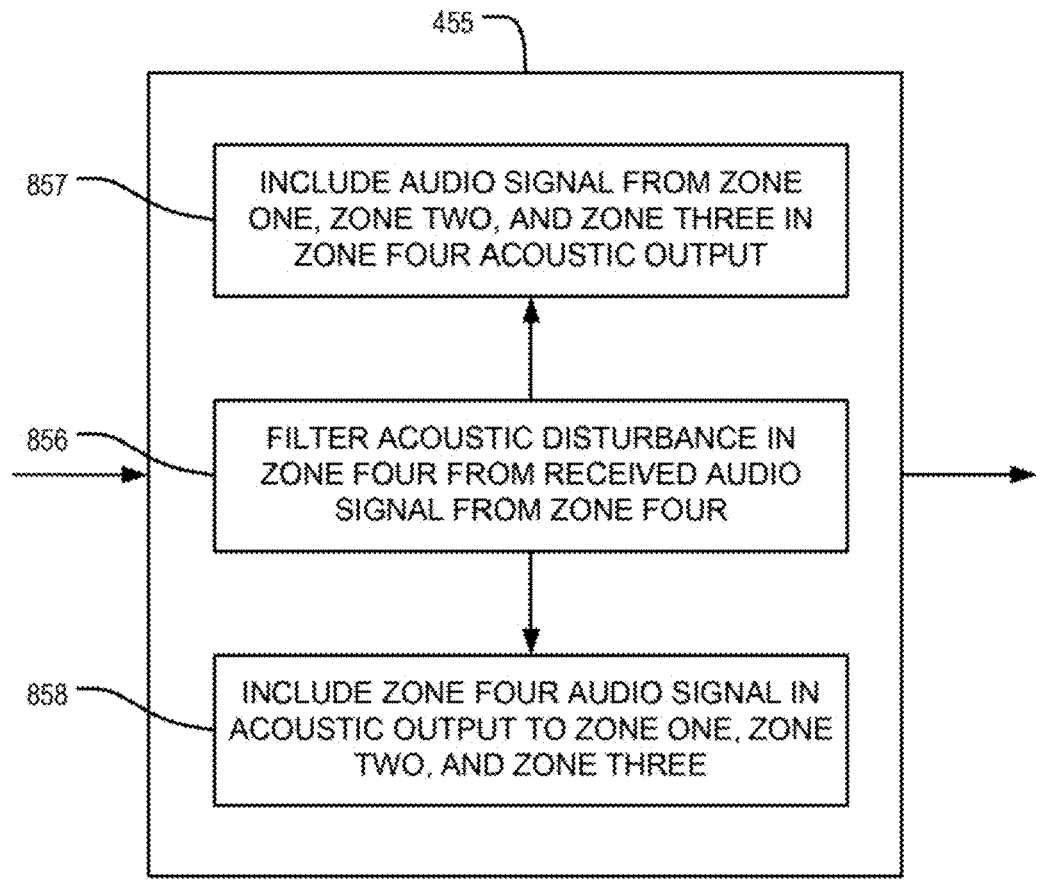
FIG. 8A is a flow diagram of a sub process of a process of controlling an in-car communication system of a vehicle, according to an exemplary embodiment of the present disclosure.
Figure 8B:
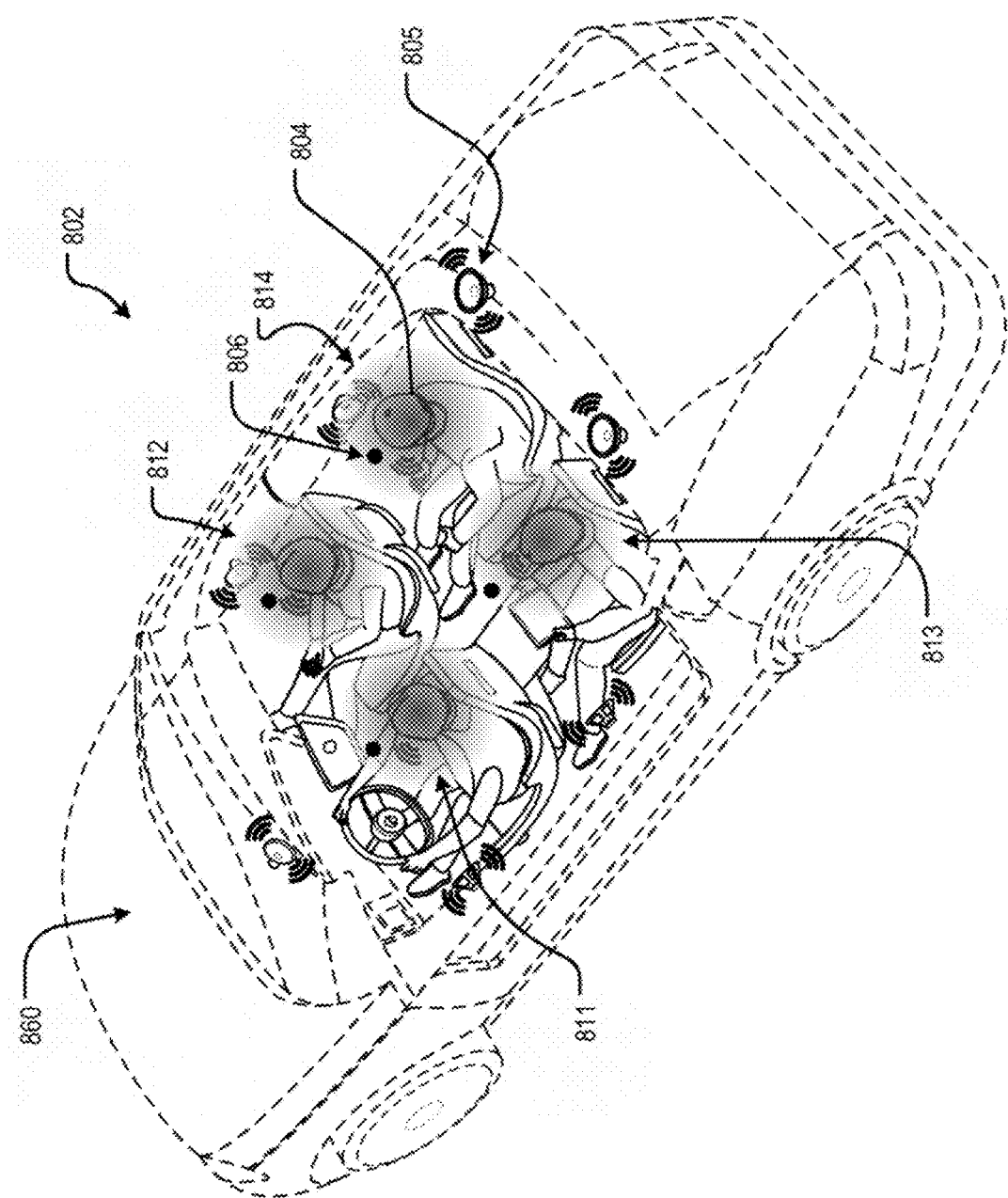
FIG. 8B is an illustration of a sub process of a process of controlling an in-car communication system of a vehicle, according to an exemplary embodiment of the present disclosure.

First, with reference to FIG. 8A and FIG. 8B, a request can be received from a passenger 804 within auditory zone four 814 to participate in vehicle conversation, the request (i.e. correlated acoustic signature) being received by an ECU 860 of a vehicle, the ECU 860 performing a method of an ICC system 802. To this end, an audio signal received from a microphone 806 of an auditory device within auditory zone four 814 can be processed, at step 856 of sub process 455, to remove or filter the detected acoustic disturbance from the received audio signal. In this way, the potentially harsh sound of the detected acoustic disturbance of auditory zone four 814 can be prevented from being delivered to speakers 805 of auditory zone one 811, auditory zone two 812, and auditory zone three 813. Subsequently, at step 857 and step 858, the filtered audio signal from auditory zone four can be integrated with received audio signals from auditory zone one, auditory zone two, and auditory zone three and can be further modified according to processes of the ICC system 802. In an embodiment, at step 857, the acoustic output supplied to auditory zone four 814 can include features of audio signals received from auditory zone one 811, auditory zone two 812, and auditory zone three 813. Conversely, at step 858, the acoustic output supplied to auditory zone one 811, auditory zone two 812, and auditory zone three 813 can include features of the audio signal received from auditory zone four 814. In this way, the passenger of auditory zone four 814 can be included in vehicle conversation.

Figure 9A:
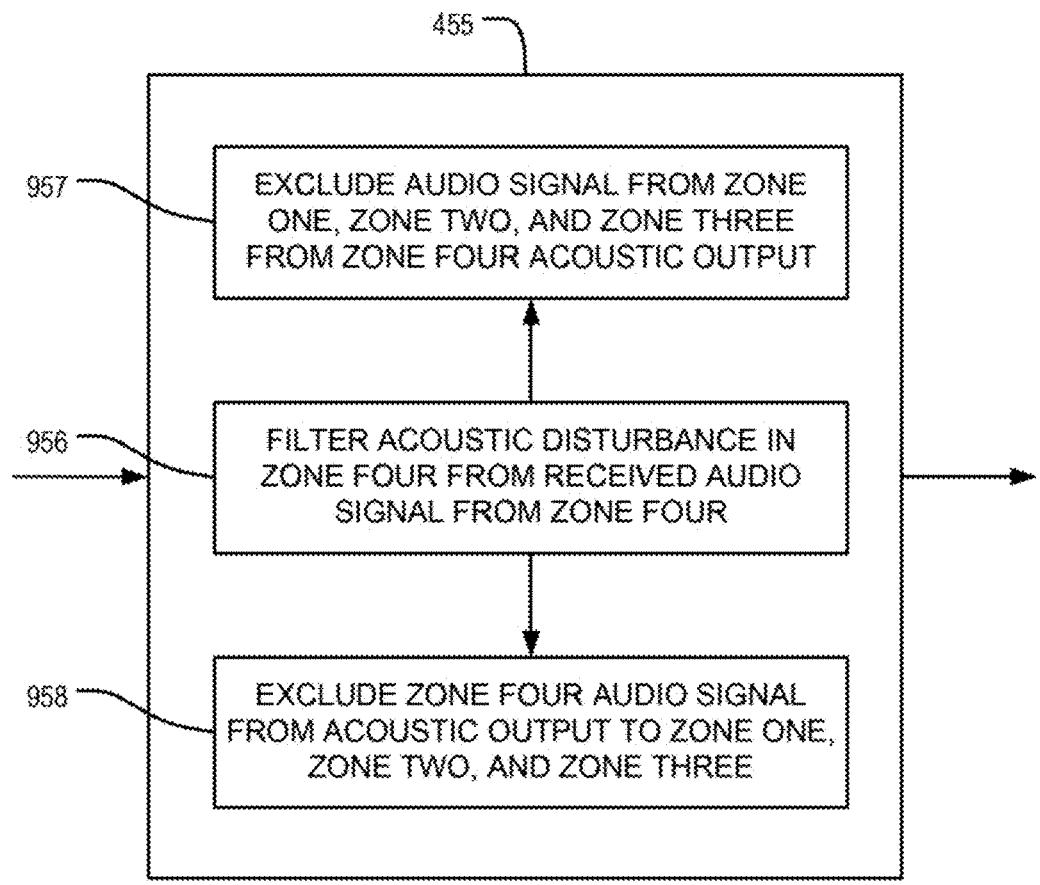
FIG. 9A is a flow diagram of a sub process of a process of controlling an in-car communication system of a vehicle, according to an exemplary embodiment of the present disclosure.
Figure 9B:
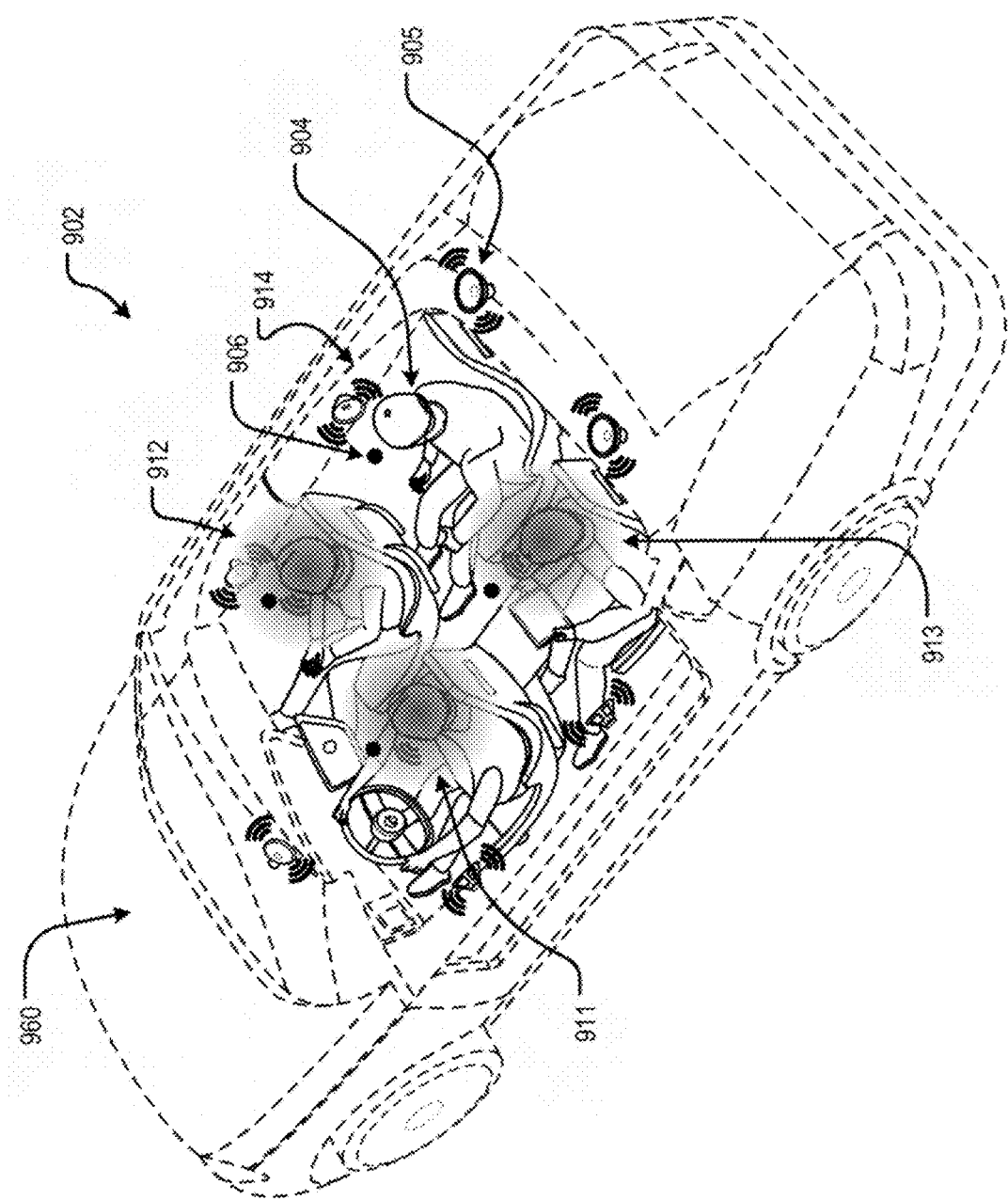
FIG. 9B is an illustration of a sub process of a process of controlling an in-car communication system of a vehicle, according to an exemplary embodiment of the present disclosure.

Similarly, with reference to FIG. 9A and FIG. 9B, a request can be received from a passenger 904 within auditory zone four 914 to be excluded from vehicle conversation, the request (i.e. correlated acoustic signature) being received by an ECU 960 of a vehicle, the ECU 960 performing a method of an ICC system 902. To this end, an audio signal received from a microphone 906 of an auditory device within auditory zone four 914 can be processed, at step 956 of sub process 455, to remove or filter the detected acoustic disturbance from the received audio signal. Subsequently, at step 957 and step 958, the filtered audio signal from auditory zone four can be integrated with received audio signals from auditory zone one, auditory zone two, and auditory zone three and can be further modified according to processes of the ICC system 902. In an embodiment, at step 957, the acoustic output supplied to auditory zone four 914 can exclude features of audio signals received from auditory zone one 911, auditory zone two 912, and auditory zone three 913. Conversely, at step 958, the acoustic output supplied to auditory zone one 911, auditory zone two 912, and auditory zone three 913 can exclude features of the audio signal received from auditory zone four 914. In this way, the passenger of auditory zone four 914 can be excluded from vehicle conversation, as indicated by the absence of a circular hue gradient around auditory zone four 914.

Figure 10:
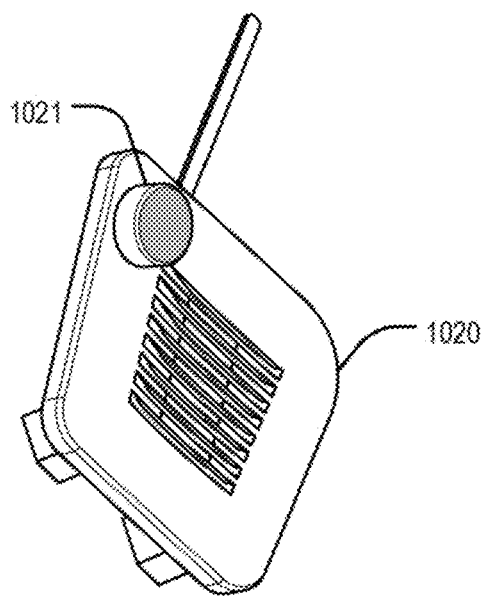
FIG. 10 is an illustration of an auditory device of an in-car communication system of a vehicle in an active state, according to an exemplary embodiment of the present disclosure.

Referring now to FIG. 10, and as described above, a passenger of an auditory zone may interact with a housing of an auditory device 1020 in order to, in an example, indicate a desire to participate in be excluded from vehicle conversation. Following interaction of the passenger with the housing of the auditory device 1020, a status of a visual indicator 1021 of the auditory device 1020 can be adjusted in accordance with the process of FIG. 4 to reflect the participation status of the auditory zone. For instance, a passenger may indicate, via two sequential taps on the housing of the auditory device 1020, a desire to participate in vehicle conversation. The visual indicator 1021 may be a lighting device such as an LED. Accordingly, and following modification to the acoustic outputs of each auditory zone of the ICC system, the visual indicator 1021, or LED, can be activated to indicate that the auditory zone is currently participating in vehicle conversation.

Figure 11:
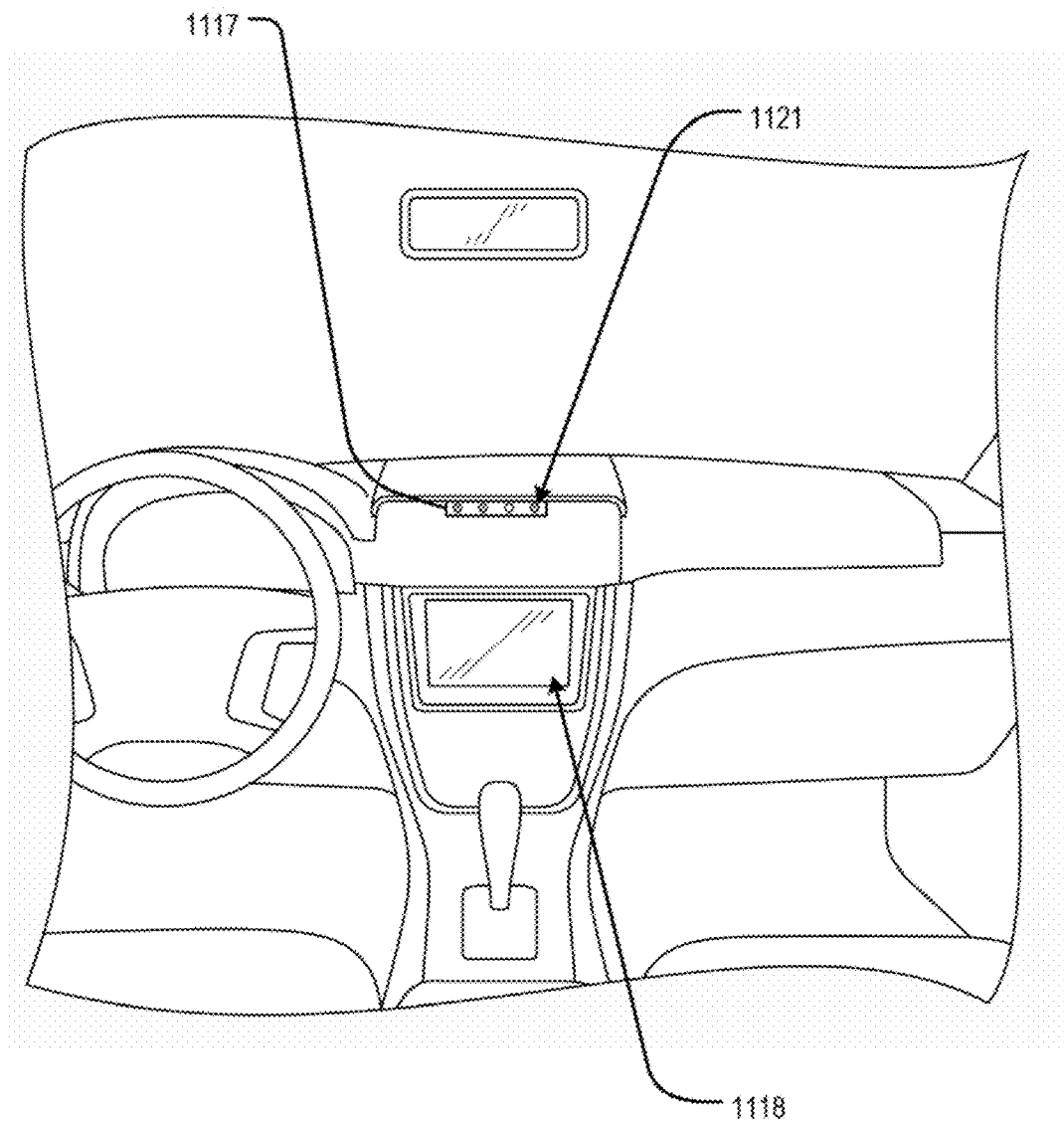
FIG. 11 is an illustration of a visual indicator panel of an in-car communication system of a vehicle, according to an exemplary embodiment of the present disclosure.

According to an embodiment, each auditory device and visual indicator can be proximate a respective auditory zone of a vehicle. In an embodiment, and as shown in FIG. 11, a visual indicator may additionally be one of a set of visual indicators grouped together such that passengers of a vehicle can be informed of which passengers are currently participating in vehicle conversation. To this end, an indicator panel 1117 can be disposed in a centrally visible location of the vehicle, the indicator panel 1117 including at least one visual indicator 1121. In an example, the indicator panel 1117 may be located on a dashboard next to an instrument panel of the vehicle and may include four visual indicators 1121, each of the four visual indicators 1121 indicating a participation status of an auditory zone of the vehicle. In another embodiment, the at least one visual indicator 1121 may be indicated on a display 1118 of the vehicle. The display 1118 may be a user interface of the vehicle and the like, the display 1118 presenting information indicating participation statuses of auditory zones of the vehicle.

According to an embodiment, the present disclosure describes a process by which a tactile interaction by a passenger with housing of an auditory device can modify, in an example, a participation status of the auditory device such that a respective auditory zone is included or excluded from vehicle conversation. Additionally, however, a participation status of a plurality of auditory zones of a vehicle may be controlled from a central location or, in an example, by a driver of the vehicle. Such centralized control of the participation status of each auditory zone of the plurality of auditory zones affords the driver control to adjust the ICC system in order to provide an improved driving experience. For instance, the driver may be in congested vehicle traffic and it may be necessary to have increased focus on a driving task. Accordingly, the driver can deactivate the ICC system or can isolate the activity of the ICC system to the rear of the vehicle. The rear of the vehicle can include two separate auditory zones (e.g. auditory zone three and auditory zone four) or can be a combined auditory zone, wherein auditory zone three and auditory zone four are treated as one auditory zone. However, in this way, the driver of the vehicle can isolate themselves from vehicle conversation and focus on the driving task at hand.

According to an embodiment, an ICC system of the present disclosure describes implementation within an entire cabin of a vehicle. In another embodiment, however, and in view of the auditory zones described herein, it can be appreciated that the ICC system may also be one or more ICC systems associated with regions of a vehicle. For instance, if a driver and another passenger in the front of the vehicle wish to have a conversation separate from the rear passengers of the vehicle, a separate ICC system may be created and implemented within the front of the vehicle, or front acoustic region. Therefore, auditory zones of the acoustic region can be active but isolated from a rear acoustic region of the vehicle.

In an embodiment, and further to the above, the ICC system may be further configured to generate, when desired, noise cancelling waveforms from one or more speakers associated with an auditory zone of the vehicle, the effect thereof providing privacy to the auditory zone.

Figure 12:
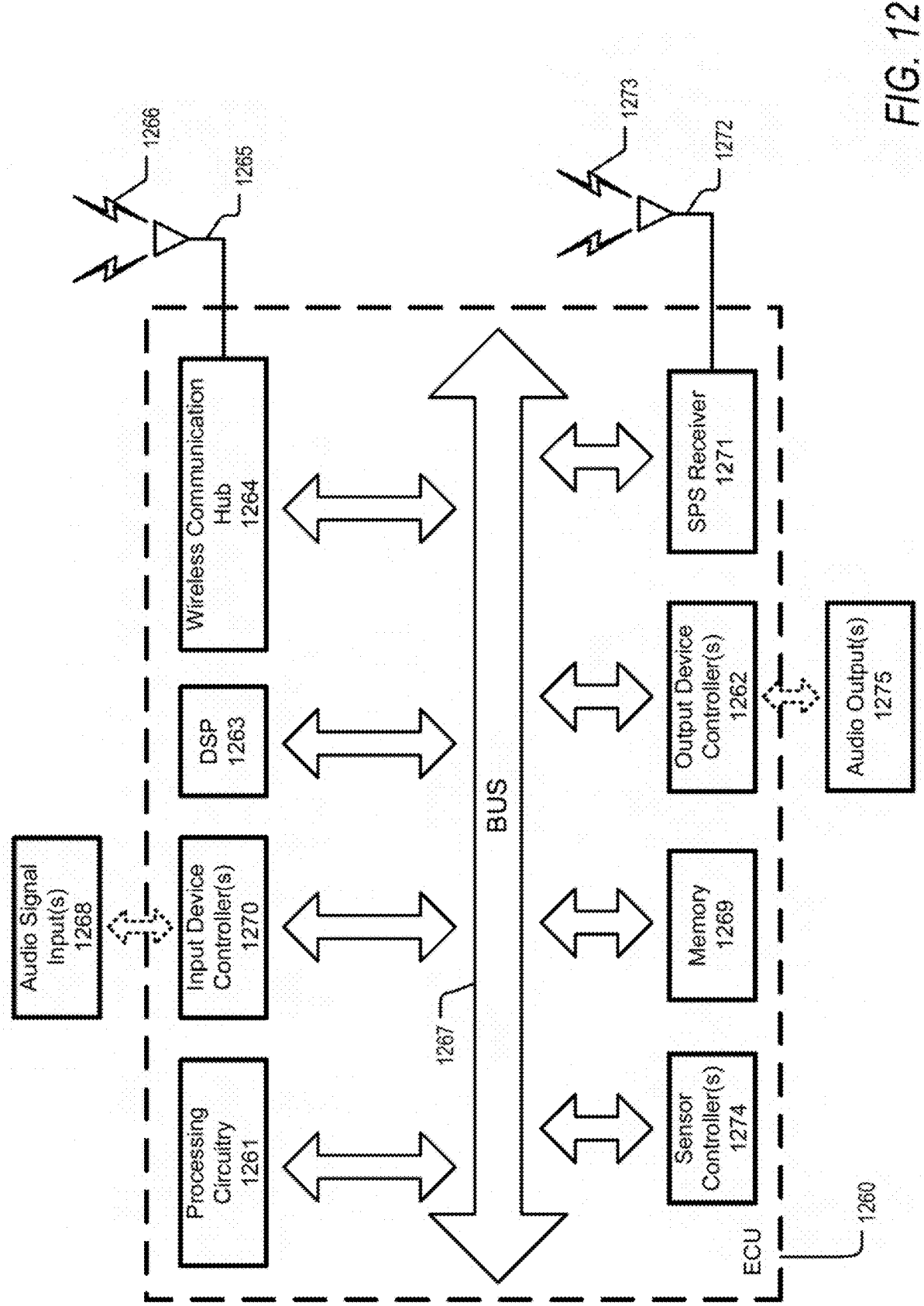
FIG. 12 is a schematic of a hardware configuration of a vehicle employing an in-car communication system, according to an exemplary embodiment of the present disclosure.

FIG. 12 is a schematic of hardware components of an exemplary embodiment of an electronics control unit (ECU) 1260 that may be implemented. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Moreover, it can be appreciate that, in an embodiment, the ECU 1260 can be configured to process data (i.e. audio signal(s)) and control operation of the in-car communication system. In another embodiment, the ECU 1260 can be configured to be in communication with remote processing circuitry configured to, in coordination with the ECU 1260, process data and control operation of the in-car communication system. The remote processing circuitry may be a centralized server or other processing circuitry separate from the ECU 1260 of the vehicle. The ECU 1260 is shown comprising hardware elements that can be electrically coupled via a BUS 1267 (or may otherwise be in communication, as appropriate). The hardware elements may include processing circuitry 1261 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 1263, depending on desired functionality.

According to an embodiment, the ECU 1260 can include one or more input device controllers 1270, which can control without limitation an in-vehicle touch screen, a touch pad, microphone, button(s), dial(s), switch(es), and/or the like. In an embodiment, one of the one or more input device controllers 1270 can be configured to control a microphone of an auditory device and can be configured to receive audio signal input(s) 1268 from one or more auditory devices of the present disclosure. Accordingly, the processing circuitry 1261 of the ECU 1260 may execute processes of the ICC system response to the received audio signal input(s) 1268 at each of the one or more auditory devices.

In an embodiment, a microphone of each of the one or more auditory devices of the ICC system can be controlled by a centralized digital signal processor via a digital audio bus. In an example, each microphone can be an electret, MEMS, or other, similar type microphone, wherein an output of each microphone can be analog or digital. In an example, the centralized digital signal processor can be one or more distributed, local digital signal processors located at each of the auditory devices. In an example, the digital audio bus may be used for transmitting received audio signals and for controlling a visual indicator, such as an LED. Accordingly, the digital audio bus can be a digital audio bus allowing for the transmittal of a microphone digital audio signal and LED diode control signals, such as an A2B bus from Analog Devices, Inc.

According to an embodiment, the ECU 1260 can also include one or more output device controllers 1262, which can control without limitation a display, a visual indicator such as an LED, speakers, and the like. For instance, the one or more output device controllers 1262 can be configured to control audio output(s) 1275 of the speakers of a vehicle such that audio output(s) 1275 levels are controlled relative to ambient vehicle cabin noise, passenger conversation, and the like. In addition, the one or more output device controllers 1262 can be configured to control a status of the visual indicator, or LED, activation of the LED indicating to passengers of a vehicle that a respective auditory zone is participating in vehicle conversation.

The ECU 1260 may also include a wireless communication hub 1264, or connectivity hub, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 1264 may permit data to be exchanged with, as described, in part, a network, wireless access points, other computer systems, and/or any other electronic devices described herein. The communication can be carried out via one or more wireless communication antenna(s) 1265 that send and/or receive wireless signals 1266.

Depending on desired functionality, the wireless communication hub 1264 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The ECU 1260 can further include sensor controller(s) 1274. Such controllers can control, without limitation, one or more sensors of the vehicle, including, among others, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. In an example, the one or more sensors includes a microphone(s) configured to measure ambient vehicle cabin noise, the measured ambient vehicle cabin noise being provided to the processing circuitry 1261 for incorporation within the methods of the ICC system.

Embodiments of the ECU 1260 may also include a Satellite Positioning System (SPS) receiver 1271 capable of receiving signals 1273 from one or more SPS satellites using an SPS antenna 1272. The SPS receiver 1271 can extract a position of the device, using various techniques, from satellites of an SPS system, such as a global navigation satellite system (GNSS) (e.g., Global Positioning System (GPS)), Galileo over the European Union, GLObal NAvigation Satellite System (GLONASS) over Russia, Quasi-Zenith Satellite System (QZSS) over Japan, Indian Regional Navigational Satellite System (IRNSS) over India, Compass/BeiDou over China, and/or the like. Moreover, the SPS receiver 1271 can be used by various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 1260 may further include and/or be in communication with a memory 1269. The memory 1269 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1269 of the ECU 1260 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended Figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for controlling a plurality of speakers of an in-vehicle communication system, comprising receiving, by processing circuitry, a first audio signal generated by a first microphone of a plurality of microphones having a sound inlet, detecting, by the processing circuitry, an acoustic disturbance in the received first audio signal, the detected acoustic disturbance in the received first audio signal resulting from a tactile interaction proximate the sound inlet of the first microphone, determining, by the processing circuitry, whether the detected acoustic disturbance correlates to a pre-defined acoustic signature, and generating, by the processing circuitry and based upon the determining that the detected acoustic disturbance correlates to the pre-defined acoustic signature, a control signal corresponding to the pre-defined acoustic signature, the generated control signal controlling one or more of the plurality of speakers of the in-vehicle communication system.

(2) The method according to (1), further comprising generating, by the processing circuitry, a second acoustic output based at least on the received first audio signal and a third audio signal corresponding to a third microphone of the plurality of microphones, a second acoustic output being output to a second speaker of the plurality of speakers of the in-vehicle communication system, wherein a first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates the first microphone of the plurality of microphones is active.

(3) The method according to either (1) or (2), further comprising generating, by the processing circuitry, a second acoustic output based at least on a third audio signal corresponding to a third microphone of the plurality of microphones, the second acoustic output being output to a second speaker of the plurality of speakers, and generating, by the processing circuitry, a first acoustic output excluding a second audio signal corresponding to a second microphone of the plurality of microphones and the third audio signal corresponding to the third microphone of the plurality of microphones, the generated first acoustic output being output to a first speaker of the plurality of speakers, wherein the first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates an exclusion of the first audio signal from the plurality of speakers.

(4) The method according to any of (1) to (3), further comprising filtering, by the processing circuitry, the detected acoustic disturbance from an output audio signal, the output audio signal being output to one or more of the plurality of speakers of the in-vehicle communication system.

(5) The method according to any of (1) to (4), further comprising modifying, by the processing circuitry, a status of a visual indicator based upon the generated control signal.

(6) The method according to any of (1) to (5), wherein the visual indicator is a light-emitting diode located in a first zone of a cabin of a vehicle and indicates a status of the first microphone of the plurality of microphones.

(7) The method according to any of (1) to (6), wherein the detecting, by the processing circuitry, the acoustic disturbance in the received first audio signal includes determining whether a rate of change of the received audio signal meets a criterion.

(8) The method according to any of (1) to (7), wherein the generated control signal modulates an acoustic output of the plurality of speakers of the in-vehicle communication system.

(9) The method according to any of (1) to (8), wherein the generated control signal modulates an acoustic output of at least one of the plurality of speakers of the in-vehicle communication system by amplifying the received first audio signal from the first microphone of the plurality of microphones.

(10) The method according to any of (1) to (9), wherein a modulation of an acoustic output of a first speaker of the plurality of speakers is performed independently of a modulation of an acoustic output of a second speaker of the plurality speakers.

(11) The method according to any of (1) to (10), wherein the tactile interaction is a tap, a flick, a brushing, or a sequence thereof.

(12) A system for controlling an in-vehicle communication system, comprising a plurality of speakers, a plurality of microphones, and processing circuitry configured to receive a first audio signal generated by a first microphone of the plurality of microphones, the first microphone of the plurality of microphones having a sound inlet, detect an acoustic disturbance in the received first audio signal, the detected acoustic disturbance in the received audio signal resulting from a tactile interaction proximate the sound inlet of the first microphone of the plurality of microphones, determine whether the detected acoustic disturbance correlates to a pre-defined acoustic signature, and generate, based upon the determination of whether the detected acoustic disturbance correlates to the pre-defined acoustic signature, a control signal corresponding to the pre-defined acoustic signature, the generated control signal controlling one or more of the plurality of speakers of the in-vehicle communication system.

(13) The system according to (12), wherein the processing circuitry is further configured to generate a second acoustic output based at least on the received first audio signal and a third audio signal corresponding to a third microphone of the plurality of microphones, a second acoustic output being output to a second speaker of the plurality of speakers of the in-vehicle communication system, wherein a first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates the first microphone of the plurality of microphones is active.

(14) The system according to either (12) or (13), wherein the processing circuitry is further configured to generate a second acoustic output based at least on a third audio signal corresponding to a third microphone of the plurality of microphones, the second acoustic output being output to a second speaker of the plurality of speakers, and generate a first acoustic output excluding a second audio signal corresponding to a second microphone of the plurality of microphones and the third audio signal corresponding to the third microphone of the plurality of microphones, the generated first acoustic output being output to a first speaker of the plurality of speakers, wherein the first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates an exclusion of the first audio signal from the plurality of speakers.

(15) A non-transitory computer-readable storage medium storing computer-readable instructions that, when executed by a computer, cause the computer to perform a method for controlling a plurality of speakers of an in-vehicle communication system, comprising receiving a first audio signal generated by a first microphone of a plurality of microphones having a sound inlet, detecting an acoustic disturbance in the received first audio signal, the detected acoustic disturbance in the received first audio signal resulting from a tactile interaction proximate the sound inlet of the first microphone, determining whether the detected acoustic disturbance correlates to a pre-defined acoustic signature, and generating, based upon the determining that the detected acoustic disturbance correlates to the pre-defined acoustic signature, a control signal corresponding to the pre-defined acoustic signature, the generated control signal controlling one or more of the plurality of speakers of the in-vehicle communication system.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for controlling a plurality of speakers of an in-vehicle communication system, comprising:
   receiving, by processing circuitry, a first audio signal generated by a first microphone of a plurality of microphones having a sound inlet;
   detecting, by the processing circuitry, an acoustic disturbance in the received first audio signal, the detected acoustic disturbance in the received first audio signal resulting from a tactile interaction proximate the sound inlet of the first microphone;
   determining, by the processing circuitry, whether the detected acoustic disturbance correlates to a pre-defined acoustic signature;
   generating, by the processing circuitry and based upon the determining that the detected acoustic disturbance correlates to the pre-defined acoustic signature, a control signal corresponding to the pre-defined acoustic signature, the generated control signal controlling an output audio signal output to one or more of the plurality of speakers of the in-vehicle communication system; and
   removing, by the processing circuitry and when the generated control signal indicates the first audio signal is to be excluded from the output audio signal, the first audio signal from the output audio signal output to the one or more of the plurality of speakers of the in-vehicle communication system.

2. The method according to claim 1, further comprising:
   generating, by the processing circuitry and when the generated control signal indicates the first audio signal to is to be included in the output audio signal output to the one or more of the plurality of speakers of the in-vehicle communication system, a second acoustic output based at least on the received first audio signal and a third audio signal corresponding to a third microphone of the plurality of microphones, the second acoustic output being output to a second speaker of the plurality of speakers of the in-vehicle communication system, wherein
   a first speaker of the plurality of speakers and the first microphone of the plurality of microphones are associated with a first zone of a cabin of a vehicle,
   the second speaker of the plurality of speakers and a second microphone of the plurality of microphones are associated with a second zone of the cabin of the vehicle,
   a third speaker of the plurality of speakers and the third microphone of the plurality of microphones are associated with a third zone of the cabin of the vehicle, and
   the generated control signal indicates the first microphone of the plurality of microphones is active.

3. The method according to claim 1, further comprising, when the generated control signal indicates the first audio signal is to be excluded from the output audio signal output to the one or more of the plurality of speakers of the in-vehicle communication system:
   generating, by the processing circuitry, a second acoustic output based at least on a third audio signal corresponding to a third microphone of the plurality of microphones, the second acoustic output being output to a second speaker of the plurality of speakers; and
   generating, by the processing circuitry, a first acoustic output excluding a second audio signal corresponding to a second microphone of the plurality of microphones and the third audio signal corresponding to the third microphone of the plurality of microphones, the generated first acoustic output being output to a first speaker of the plurality of speakers, wherein
   the first speaker of the plurality of speakers and the first microphone of the plurality of microphones are associated with a first zone of a cabin of a vehicle,
   the second speaker of the plurality of speakers and a second microphone of the plurality of microphones are associated with a second zone of the cabin of the vehicle, and
   a third speaker of the plurality of speakers and the third microphone of the plurality of microphones are associated with a third zone of the cabin of the vehicle.

4. The method according to claim 1, further comprising:
   filtering, by the processing circuitry, the detected acoustic disturbance from the output audio signal output to the one or more of the plurality of speakers of the in-vehicle communication system.

5. The method according to claim 1, further comprising:
   modifying, by the processing circuitry, a status of a visual indicator based upon the generated control signal.

6. The method according to claim 5, wherein the visual indicator is a light-emitting diode located in a first zone of a cabin of a vehicle and indicates a status of the first microphone of the plurality of microphones.

7. The method according to claim 1, wherein the detecting, by the processing circuitry, the acoustic disturbance in the received first audio signal includes
   determining whether a rate of change of the received audio signal meets a criterion.

8. The method according to claim 1, wherein the generated control signal modulates an acoustic output of the plurality of speakers of the in-vehicle communication system.

9. The method according to claim 8, wherein a modulation of an acoustic output of a first speaker of the plurality of speakers is performed independently of a modulation of an acoustic output of a second speaker of the plurality speakers.

10. The method according to claim 1, wherein the generated control signal modulates an acoustic output of at least one of the plurality of speakers of the in-vehicle communication system by amplifying the received first audio signal from the first microphone of the plurality of microphones.

11. The method according to claim 1, wherein the tactile interaction is a tap, a flick, a brushing, or a sequence thereof.

12. The method according to claim 1, further comprising
   adding, by the processing circuitry and when the generated control signal indicates the first audio signal is to be included in the output audio signal, the first audio signal to the output audio signal output to the one or more of the plurality of speakers of the in-vehicle communication system.

13. A system for controlling an in-vehicle communication system, comprising:
   a plurality of speakers;
   a plurality of microphones; and
   processing circuitry configured to
      receive a first audio signal generated by a first microphone of the plurality of microphones, the first microphone of the plurality of microphones having a sound inlet,
      detect an acoustic disturbance in the received first audio signal, the detected acoustic disturbance in the received audio signal resulting from a tactile interaction proximate the sound inlet of the first microphone of the plurality of microphones, determine whether the detected acoustic disturbance correlates to a pre-defined acoustic signature, generate, based upon the determination of whether the detected acoustic disturbance correlates to the pre-defined acoustic signature, a control signal corresponding to the pre-defined acoustic signature, the generated control signal controlling an output audio signal output to one or more of the plurality of speakers of the in-vehicle communication system; and remove, when the generated control signal indicates the first audio signal is to be excluded from the output audio signal, the first audio signal from the output audio signal output to the one or more of the plurality of speakers of the in-vehicle communication system.

14. The system according to claim 13, wherein the processing circuitry is further configured to
generate, when the generated control signal indicates the first audio signal is to be included in the output audio signal output to the one or more of the plurality of speakers of the in-vehicle communication system, a second acoustic output based at least on the received first audio signal and a third audio signal corresponding to a third microphone of the plurality of microphones, the second acoustic output being output to a second speaker of the plurality of speakers of the in-vehicle communication system, a first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates the first microphone of the plurality of microphones is active.

15. The system according to claim 13, wherein, when the generated control signal indicates the first audio signal is to be excluded from the output audio signal output to the one or more of the plurality of speakers of the in-vehicle communication system, the processing circuitry is further configured to
generate a second acoustic output based at least on a third audio signal corresponding to a third microphone of the plurality of microphones, the second acoustic output being output to a second speaker of the plurality of speakers, and generate a first acoustic output excluding a second audio signal corresponding to a second microphone of the plurality of microphones and the third audio signal corresponding to the third microphone of the plurality of microphones, the generated first acoustic output being output to a first speaker of the plurality of speakers, the first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, and a third speaker of the plurality of speakers and the third microphone of the plurality of microphones are associated with a third zone of the cabin of the vehicle.

16. The system according to claim 13, wherein the processing circuitry is further configured to
add, when the generated control signal indicates the first audio signal is to be included in the output audio signal, the first audio signal to the output audio signal output to the one or more of the plurality of speakers of the in-vehicle communication system.

17. A non-transitory computer-readable storage medium storing computer-readable instructions that, when executed by a computer, cause the computer to perform a method for controlling a plurality of speakers of an in-vehicle communication system, comprising:

receiving a first audio signal generated by a first microphone of a plurality of microphones having a sound inlet;

detecting an acoustic disturbance in the received first audio signal, the detected acoustic disturbance in the received first audio signal resulting from a tactile interaction proximate the sound inlet of the first microphone;

determining whether the detected acoustic disturbance correlates to a pre-defined acoustic signature;

generating, based upon the determining that the detected acoustic disturbance correlates to the pre-defined acoustic signature, a control signal corresponding to the pre-defined acoustic signature, the generated control signal controlling an output audio signal to one or more of the plurality of speakers of the in-vehicle communication system; and removing, when the generated control signal indicates the first audio signal is to be excluded from the output audio signal, the first audio signal from the output audio signal output to the one or more of the plurality of speakers of the in-vehicle communication system.

18. The non-transitory computer-readable storage medium according to claim 17, further comprising:
generating, when the generated control signal indicates the first audio signal is to be included in the output audio signal output to the one or more of the plurality of speakers of the in-vehicle communication system, a second acoustic output based at least on the received first audio signal and a third audio signal corresponding to a third microphone of the plurality of microphones, the second acoustic output being output to a second speaker of the plurality of speakers of the in-vehicle communication system, a first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, a third speaker of the plurality of speakers and the third microphone of the plurality of microphones are associated with a third zone of the cabin of the vehicle, and the generated control signal indicates the first microphone of the plurality of microphones is active.

19. The non-transitory computer-readable storage medium according to claim 17, further comprising, when the generated control signal indicates the first audio signal is to be excluded from the output audio signal output to the one or more of the plurality of speakers of the in-vehicle communication system, generating a second acoustic output based at least on a third audio signal corresponding to a third microphone of the plurality of microphones, the second acoustic output being output to a second speaker of the plurality of speakers, and generating a first acoustic output excluding a second audio signal corresponding to a second microphone of the plurality of microphones and the third audio signal corresponding to the third microphone of the plurality of microphones, the generated first acoustic output being output to a first speaker of the plurality of speakers, the first speaker of the plurality of speakers and the first microphone of the plurality of microphones are associated with a first zone of a cabin of a vehicle, the second speaker of the plurality of speakers and a second microphone of the plurality of microphones are associated with a second zone of the cabin of the vehicle, and a third speaker of the plurality of speakers and the third microphone of the plurality of microphones are associated with a third zone of the cabin of the vehicle.

20. The non-transitory computer-readable storage medium according to claim 17, further comprising adding, when the generated control signal indicates the first audio signal is to be included in the output audio signal, the first audio signal to the output audio signal output to the one or more of the plurality of speakers of the in-vehicle communication system.

* * * * *